Figure 1:
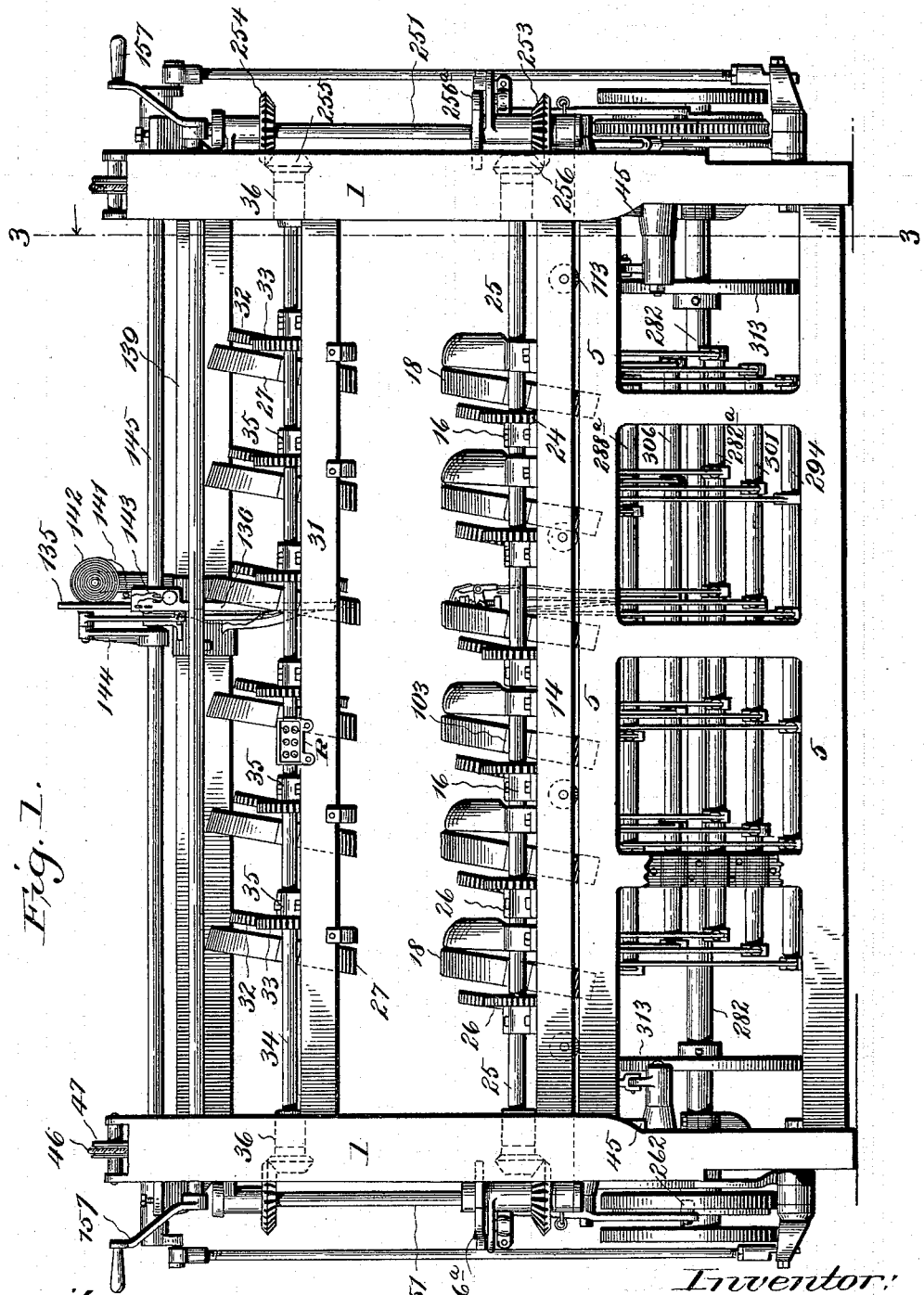

No. 612,284. Patented Oct. 11, 1898.
E. N. STEPHENSON.
MACHINE FOR TUFTING MATTRESSES.
(Application filed Dec. 23, 1897.)

(No Model.) 15 Sheets—Sheet 1.

Witnesses:
L. C. Hills
Dennis Sumby

Inventor:
Edwin N. Stephenson
By James L. Norris
Atty.

THE NORRIS PETERS CO., PHOTO-LITHO., WASHINGTON, D. C.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 2.

Witnesses:
L. C. Hills.
Dennis Sumby.

Inventor:
Edwin N. Stephenson,
By James L. Norris.
Atty.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 3.

Witnesses:
L. C. Hills.
Dennis Sumby.

Inventor:
Edwin N. Stephenson.
By James L. Norris.
Atty.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 5.

Witnesses:
L. C. Hills.
Dennis Sumby.

Inventor:
Edwin N. Stephenson,
By James L. Norris
Atty.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 6.

Witnesses:
L. C. Hills.
Dennis Sumby.

Inventor:
Edwin N. Stephenson,
By James L. Norris.
Atty.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 7.

Witnesses: L. C. Hills, Dennis Sumby.
Inventor: Edwin N. Stephenson, By James L. Norris, Atty.

No. 612,284. Patented Oct. 11, 1898.
E. N. STEPHENSON.
MACHINE FOR TUFTING MATTRESSES.
(Application filed Dec. 23, 1897.)

(No Model.) 15 Sheets—Sheet 8.

Witnesses:
L. C. Hills.
Dennis Sumby.

Inventor:
Edwin N. Stephenson,
By James L. Norris.
Atty.

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 9.
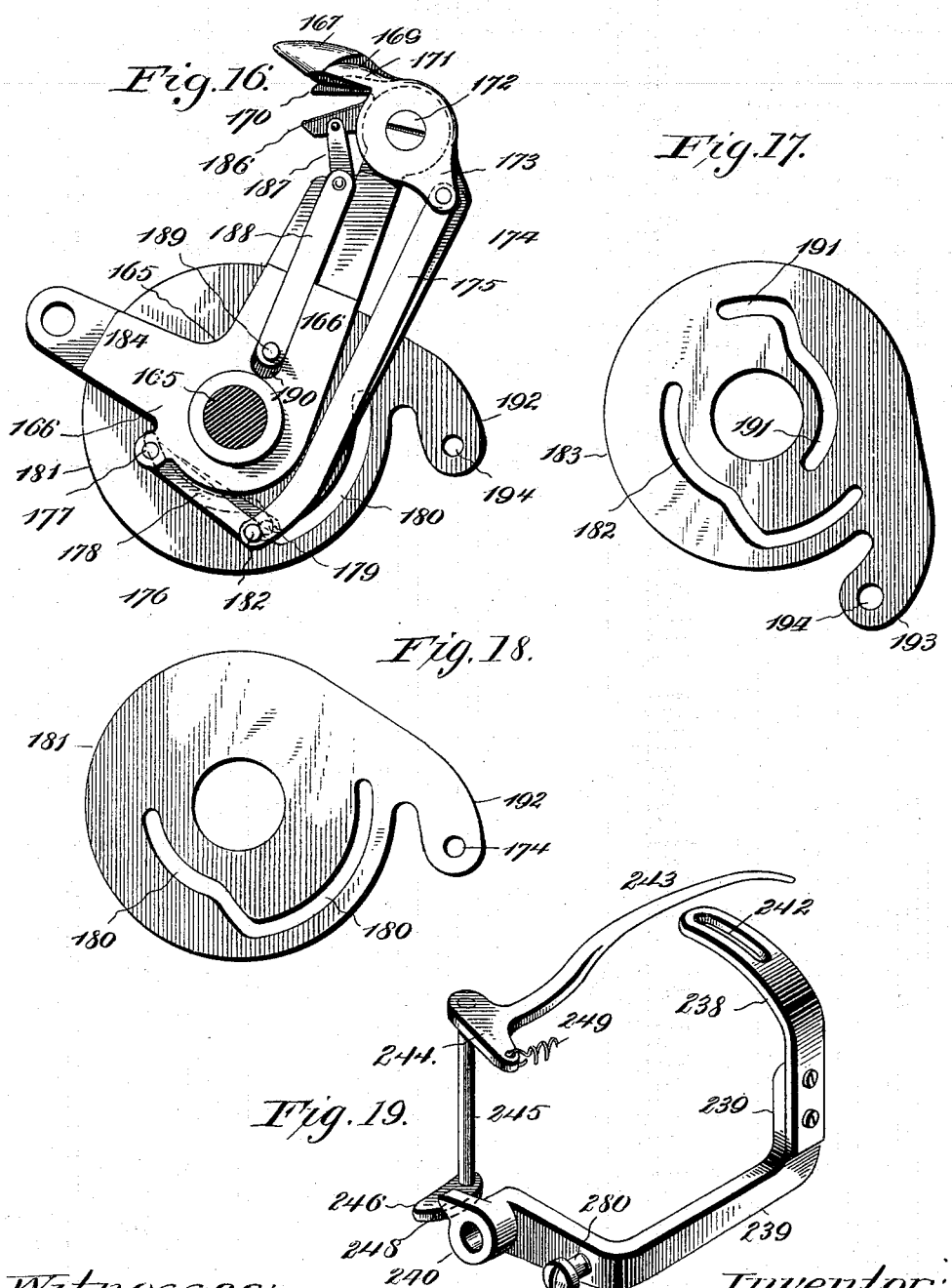

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 10.
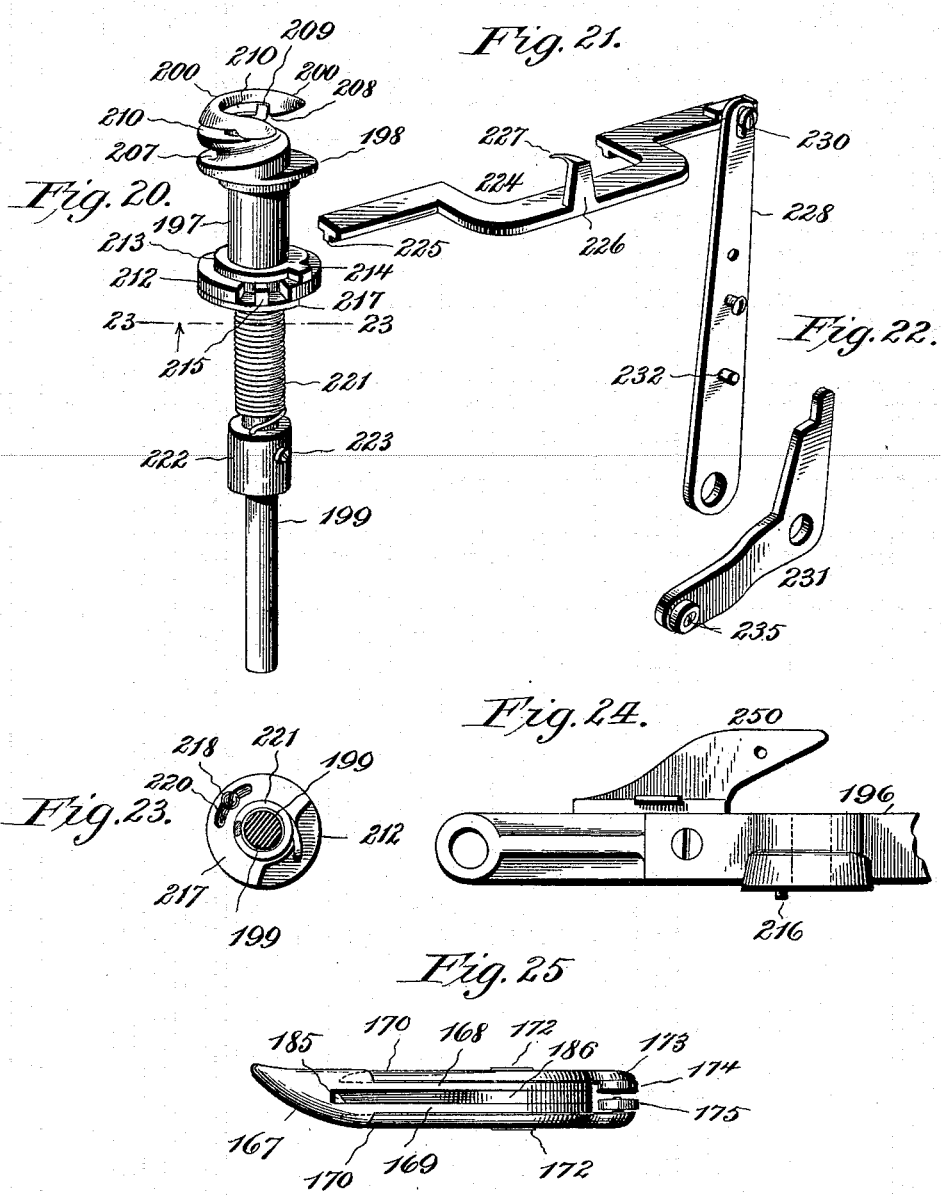

No. 612,284. Patented Oct. 11, 1898.
E. N. STEPHENSON.
MACHINE FOR TUFTING MATTRESSES.
(Application filed Dec. 23, 1897.)
(No Model.) 15 Sheets—Sheet 11.
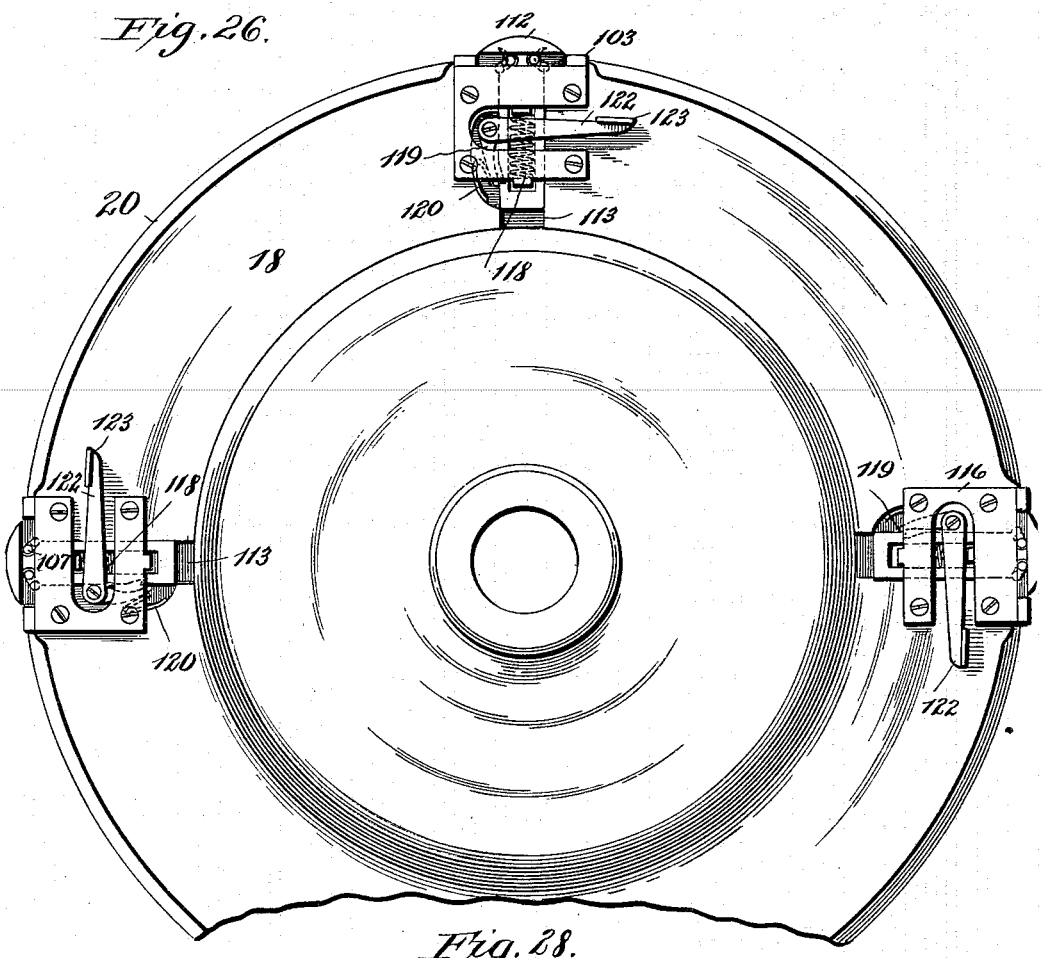
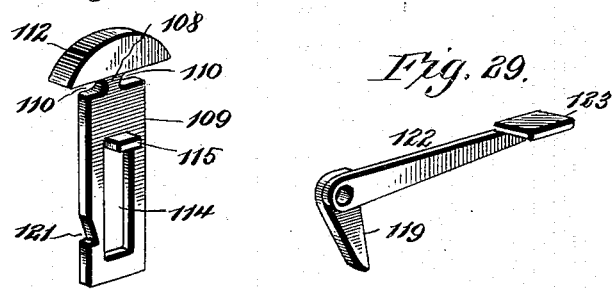
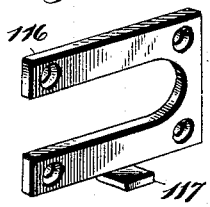
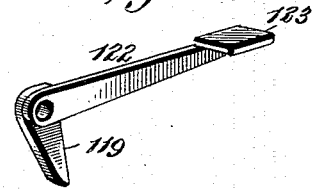
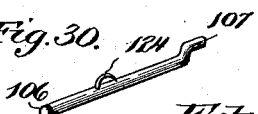
Witnesses:
L. C. Hills.
Dennis Sumby.
Inventor:
Edwin N. Stephenson,
By James L. Norris.
Atty.
THE NORRIS PETERS CO., PHOTO-LITHO., WASHINGTON, D. C.

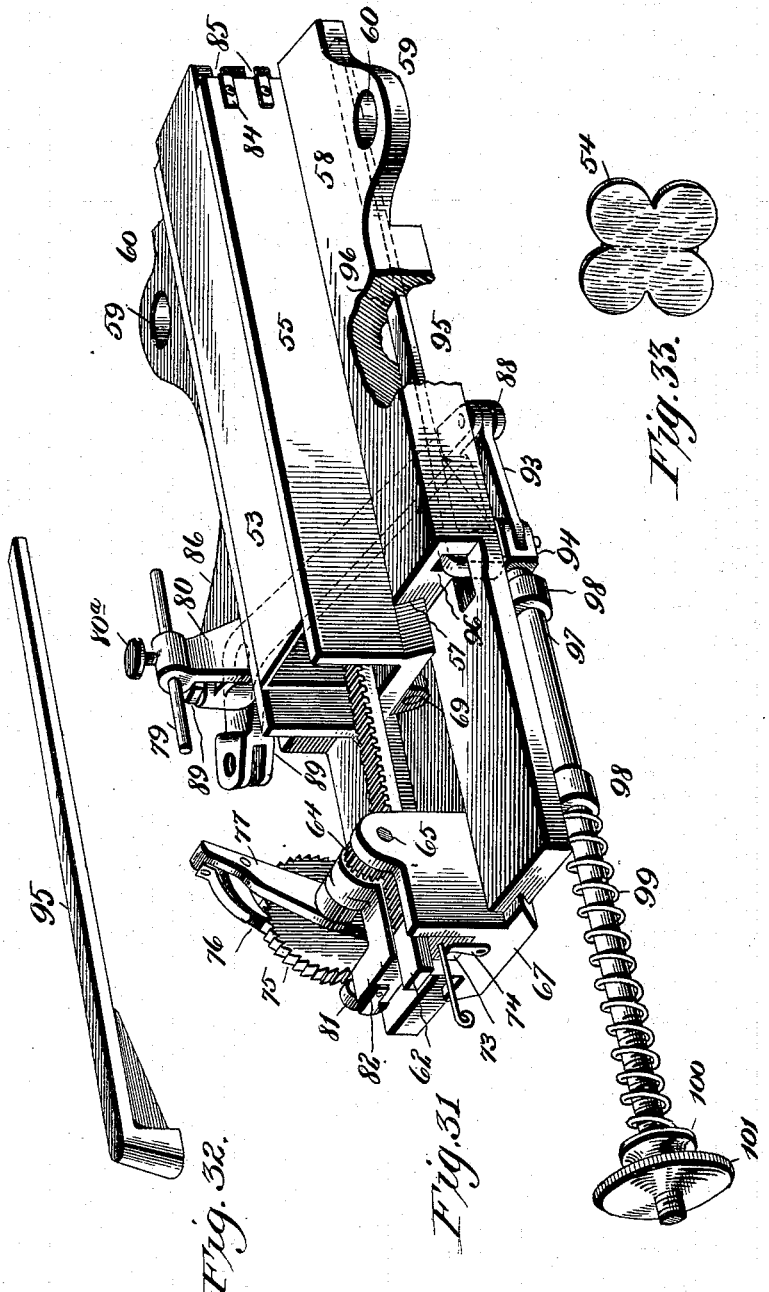

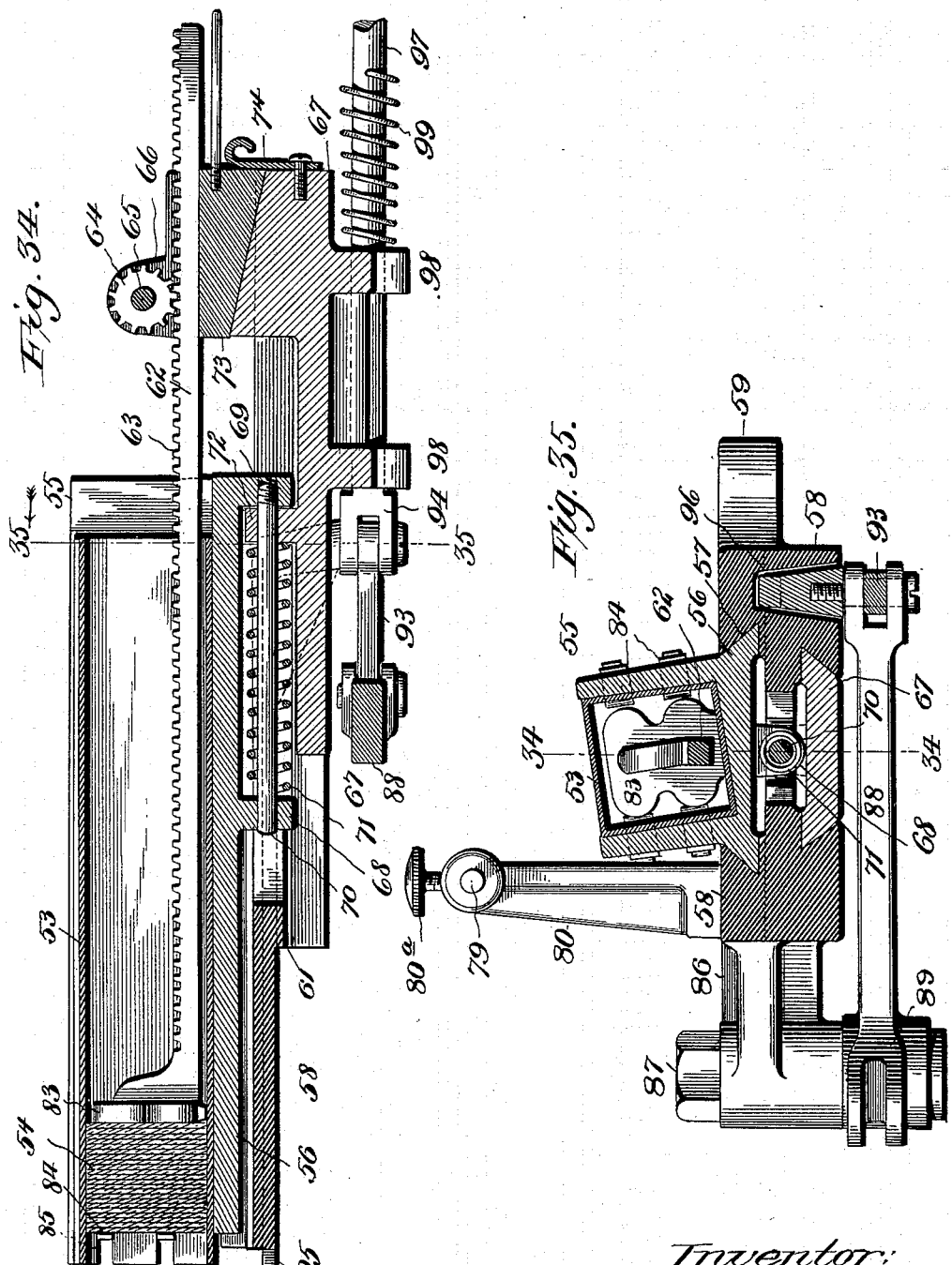

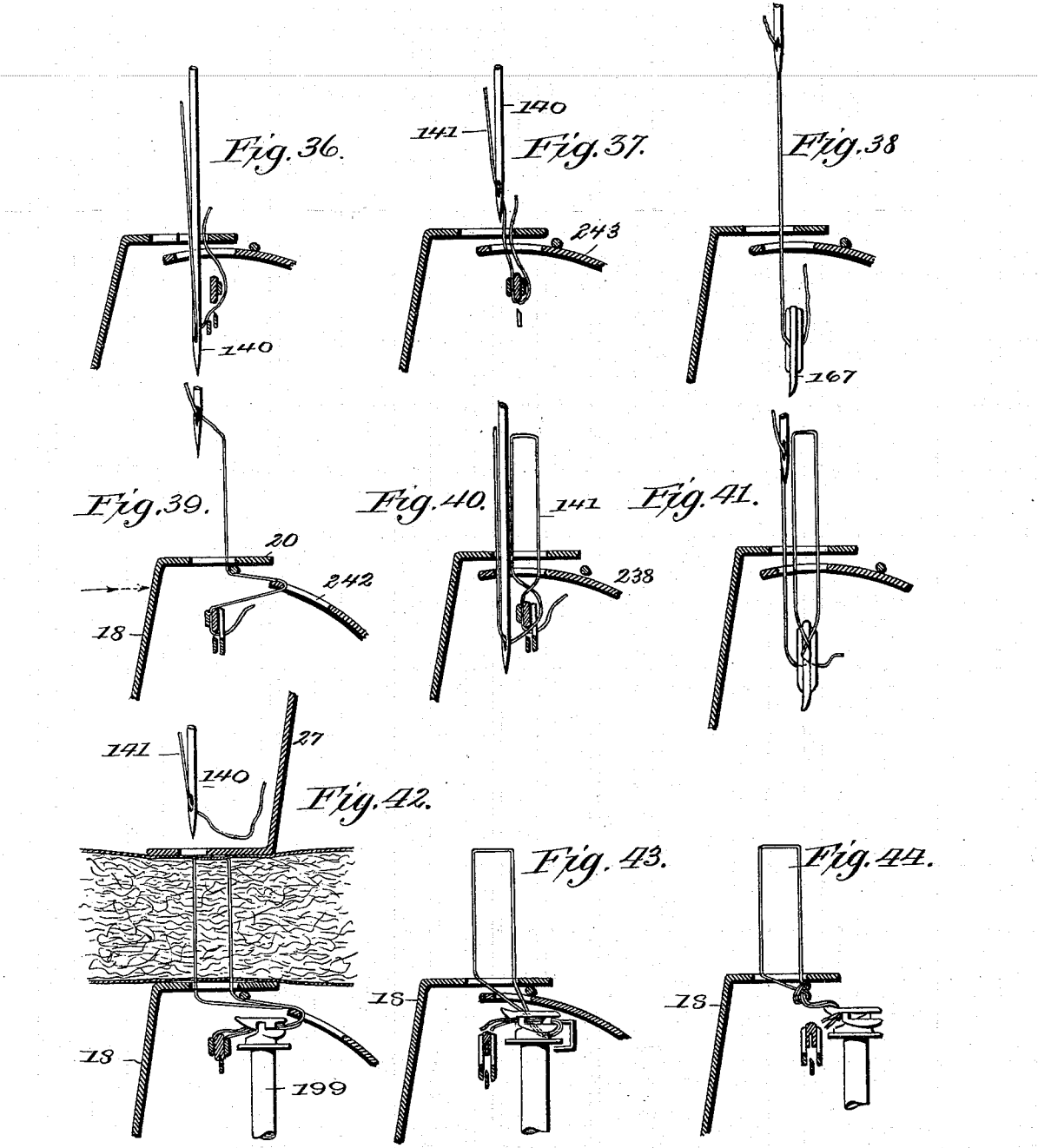

No. 612,284. Patented Oct. 11, 1898.
E. N. STEPHENSON.
MACHINE FOR TUFTING MATTRESSES.
(Application filed Dec. 23, 1897.)

(No Model.) 15 Sheets—Sheet 15.

Witnesses:
L. C. Hills
Dennis Sumby

Inventor:
Edwin N. Stephenson
By James L. Norris
Atty.

UNITED STATES PATENT OFFICE.

EDWIN NAPIER STEPHENSON, OF BOSTON, MASSACHUSETTS.

MACHINE FOR TUFTING MATTRESSES.

SPECIFICATION forming part of Letters Patent No. 612,284, dated October 11, 1898.

Application filed December 23, 1897. Serial No. 663,194. (No model.)

*To all whom it may concern:*

Be it known that I, EDWIN NAPIER STEPHENSON, a citizen of the United States, residing at Boston, in the county of Suffolk and State of Massachusetts, have invented new and useful Improvements in Machines for Tufting Mattresses, of which the following is a specification.

My invention relates to machines for tufting mattresses.

It is the purpose of my present invention to provide a machine of this type which will accomplish its work rapidly, accurately, and perfectly and which can readily be adjusted to operate upon mattresses of different thickness.

My principal objects in this invention are to render the automatic mechanism certain and accurate in all respects, to expedite the operation of the machine, to provide a simple and efficient knotting apparatus, and to so organize the latter that it shall tie a single overhand knot only in both strands of the thread.

It is also one purpose of my present invention to provide novel and efficient means for automatically feeding the tufts or "tabs" to the tuft-holding appliances upon the wheels which compress and feed the mattress.

Figure 2:
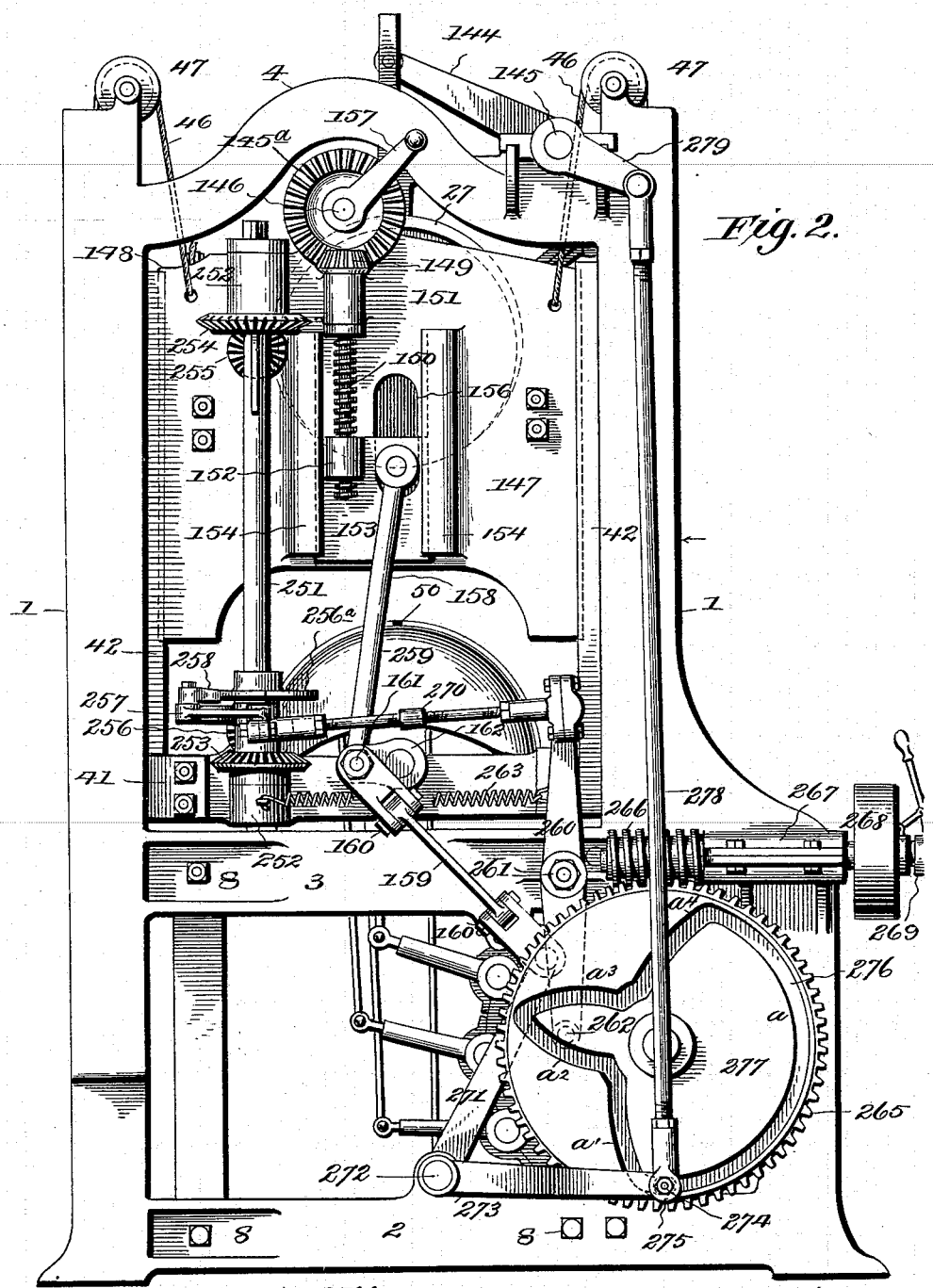
Figure 3:
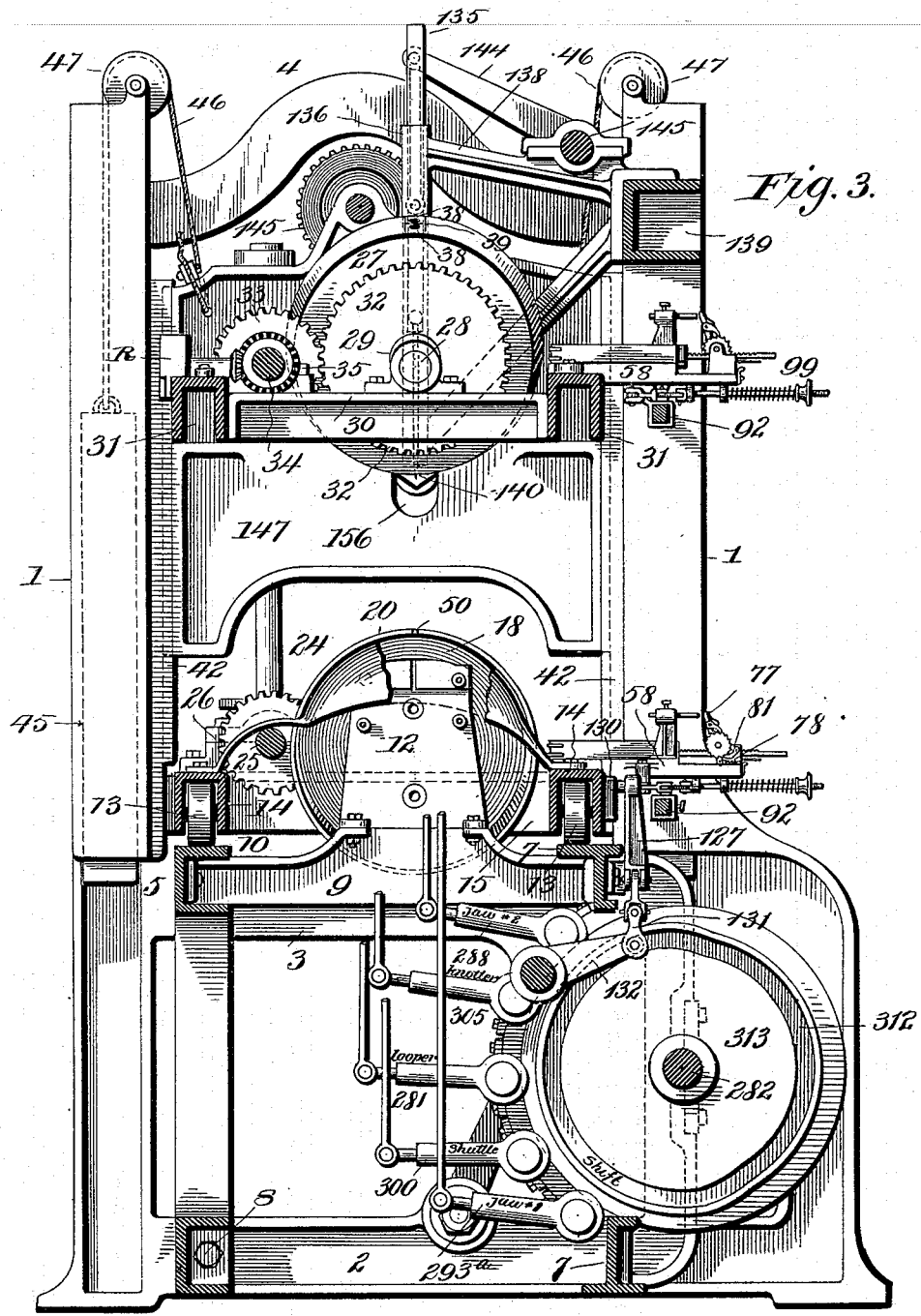
Figure 4:
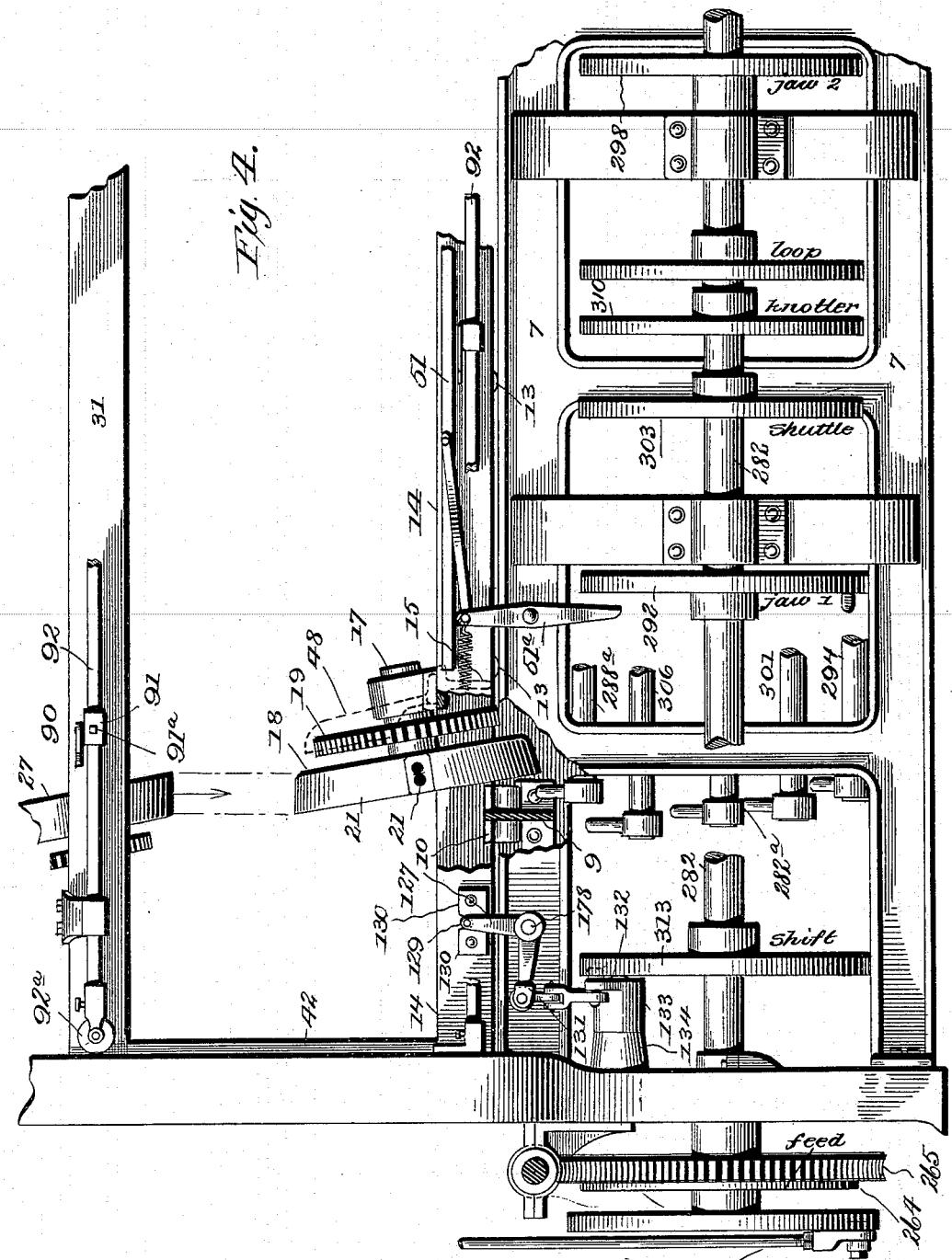
Figures 5, 6:
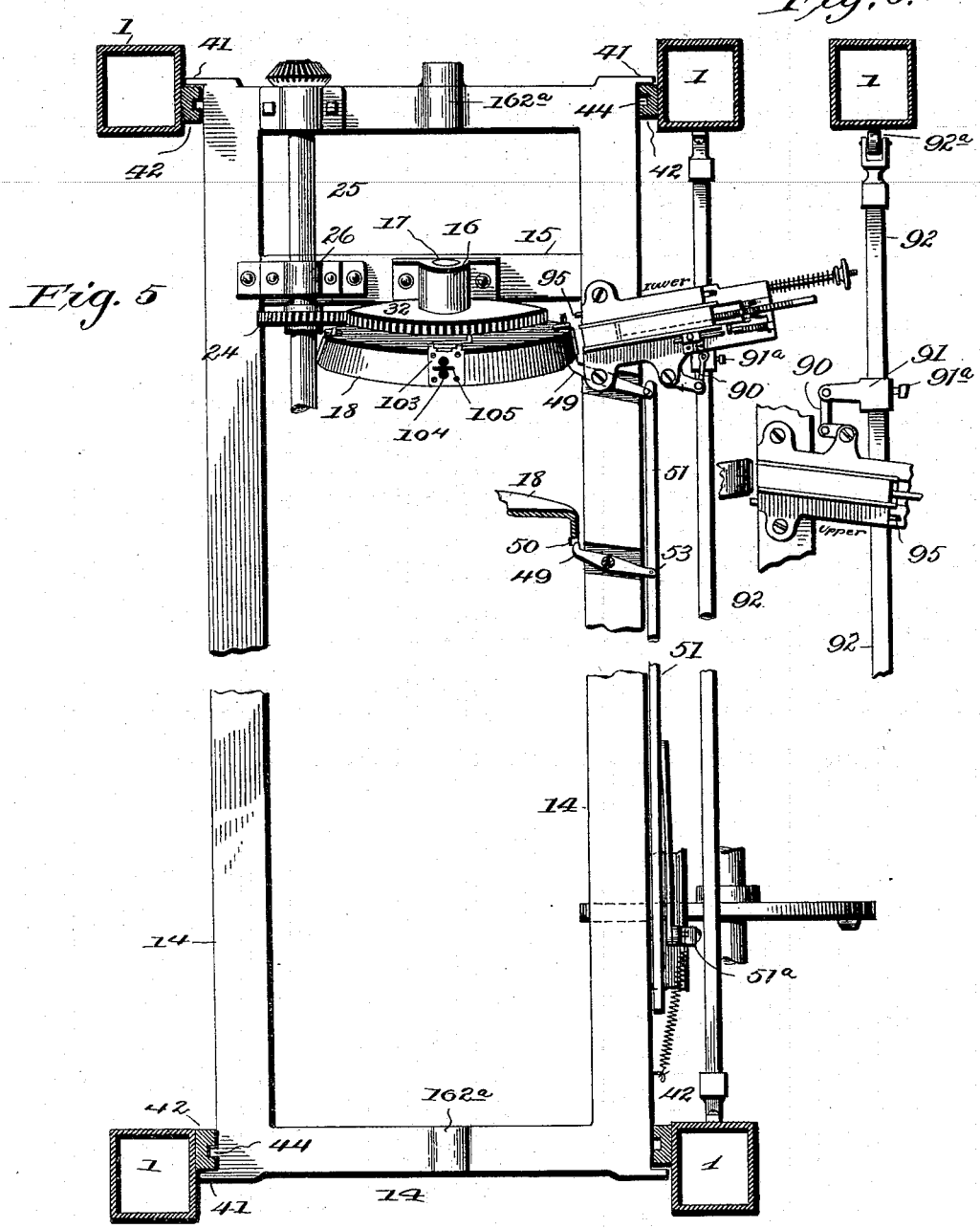
Figure 7:
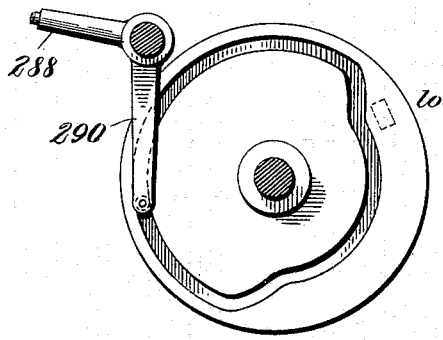
Figure 8:
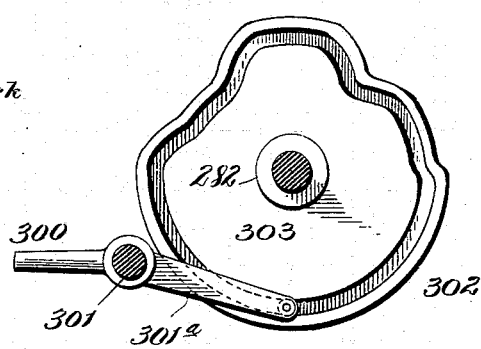
Figure 9:
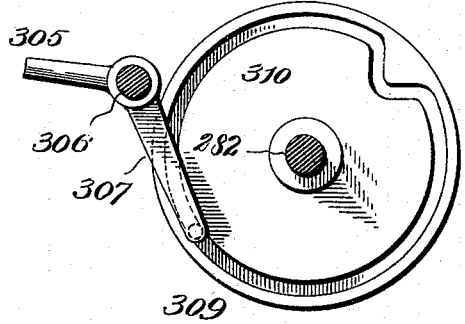
Figure 10:
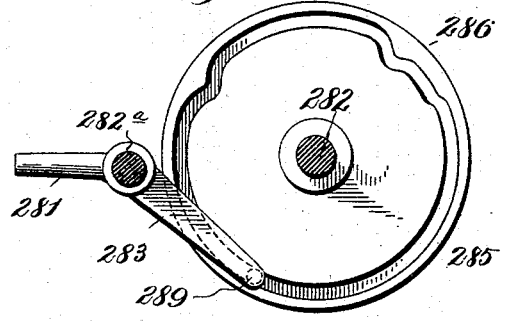
Figure 11:
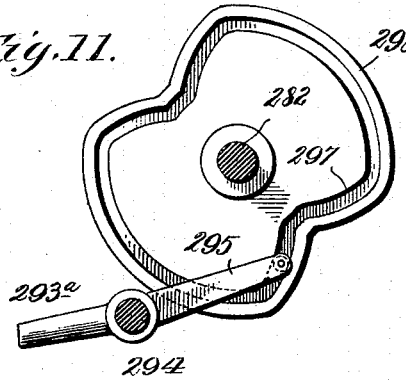
Figure 12:
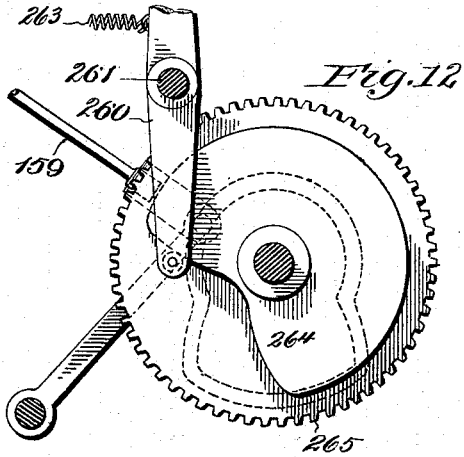
Figure 13:
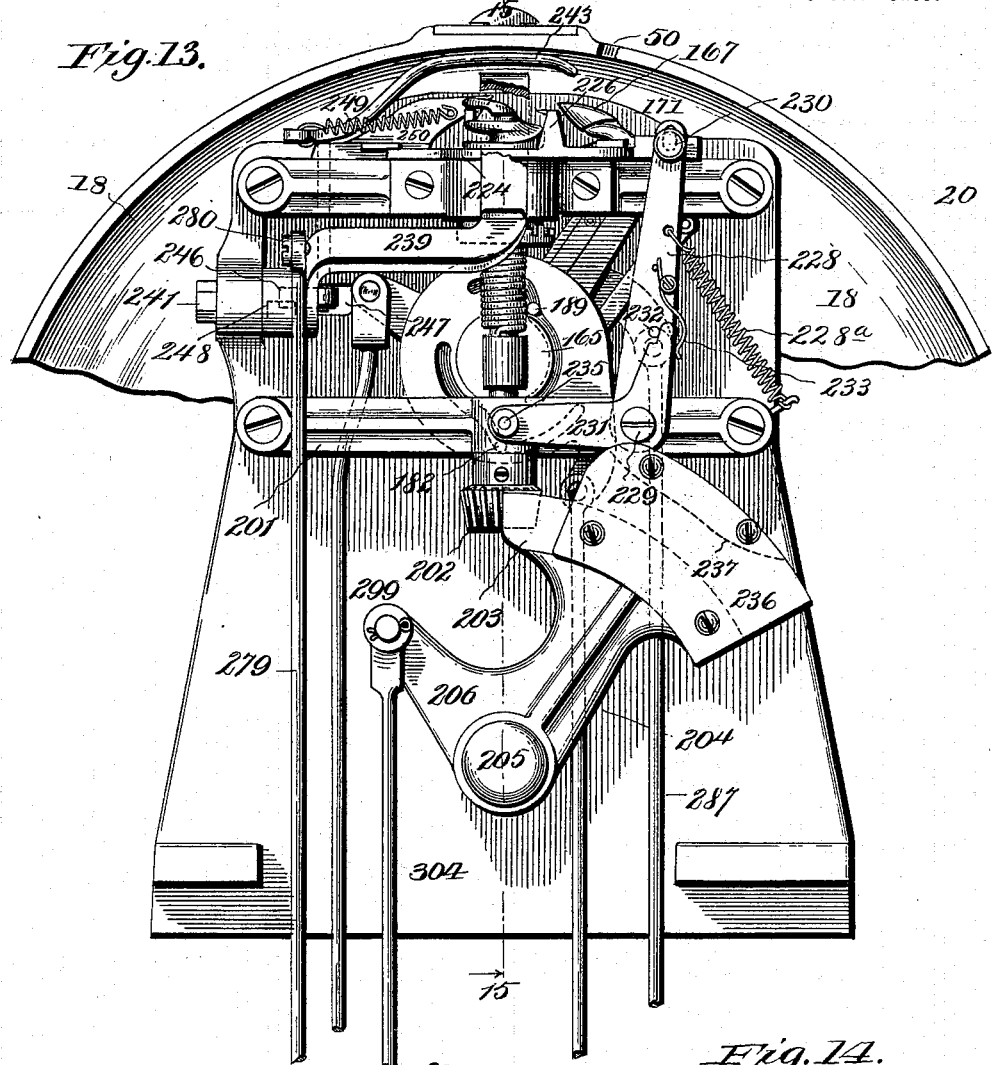
Figure 14:
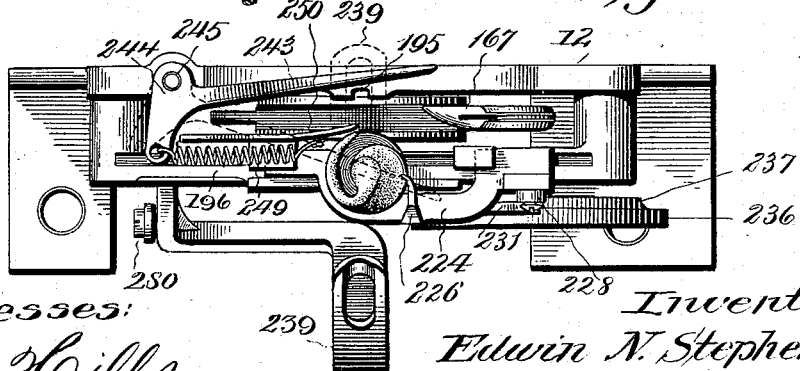
Figure 15:
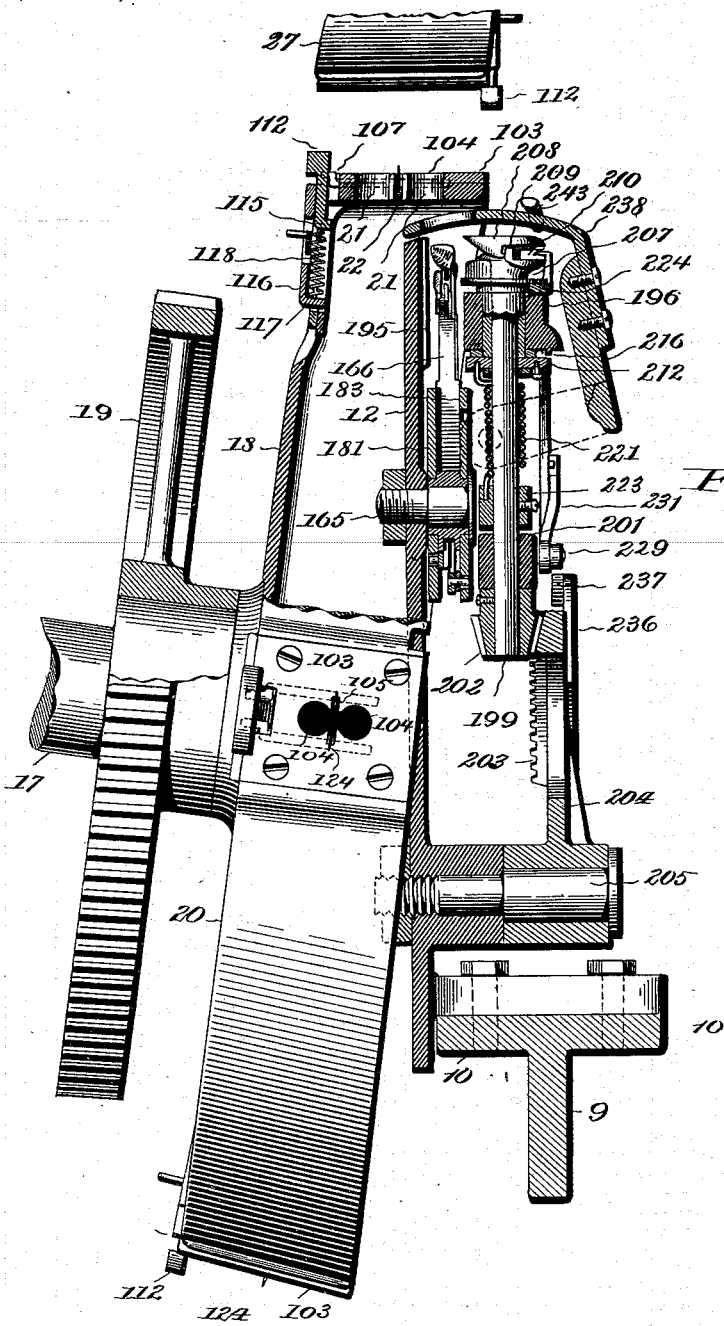
Figure 45:
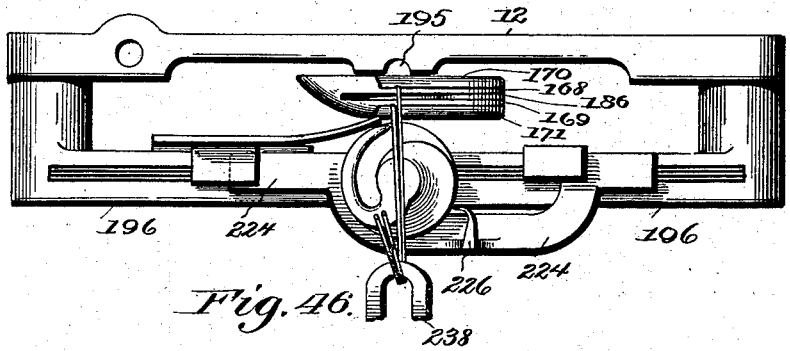
Figure 46:
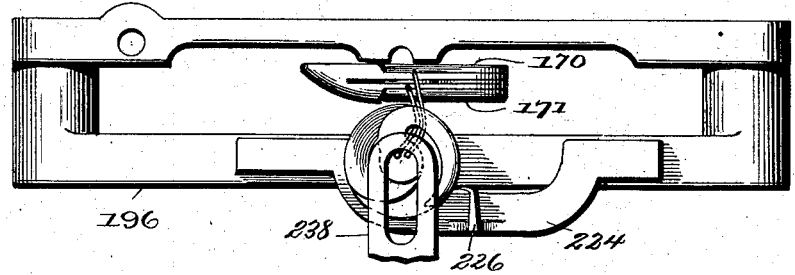
Figure 47:
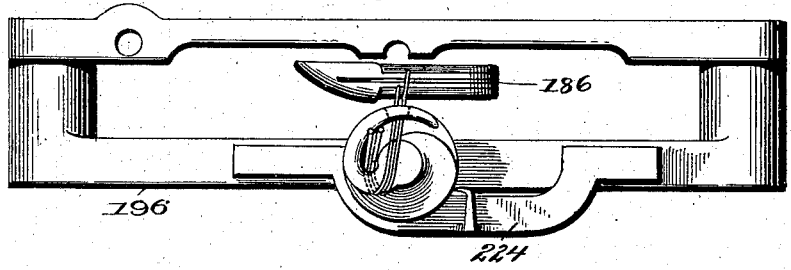
Figure 48:
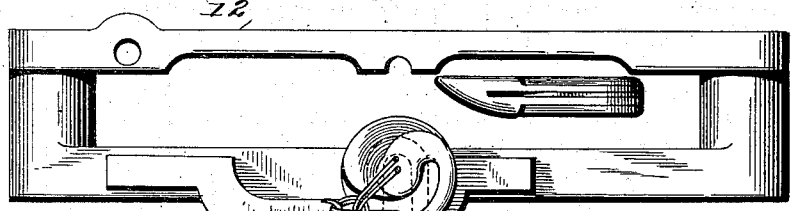

Figure 1 is an end elevation of the tufting-machine. Fig. 2 is a side elevation of the same, the figure including a detail view of part of the mechanism which advances the feed-wheels a quarter-revolution. Fig. 3 is a vertical section taken upon the line 3 3 in Fig. 1, the point of view being at the right hand of the section-plane. Fig. 4 is an elevation, upon an enlarged scale, of part of the mechanism at the left-hand end of Fig. 1, part being broken away and only a single pair of feed-wheels being illustrated. Fig. 5 is a horizontal section of the frame, the middle portion being broken away, showing the lower feed-wheel in plan view with the tuft-feeding mechanism. Fig. 6 is a plan view of one of the upper tuft-feeding mechanisms with a small portion of the corresponding feed-wheel to show the different angles of inclination. Fig. 7 is a face view of the disk having a cam-race to operate the first jaw of the knotting mechanism. Fig. 8 is a similar view of the cam operating the twine-clamp. Fig. 9 is a like view of a cam which actuates the knotter-spindle. Fig. 10 shows the cam which vibrates the looper. Fig. 11 shows the cam which operates the second jaw of the knotting mechanism. Fig. 12 is a view showing the cam which operates the feed-wheels in advancing the mattress, the dotted lines showing a cam-race on the other side of the spur-gear that operates the presser-bar through which the mattress is compressed between the arrested feed-wheels during the operations of stitching and knotting. Fig. 13 is a front elevation of one of the knotting mechanisms and the upper portion of one of the lower feed-wheels, the looper-arm being partly broken away to show the other parts. Fig. 14 is a plan view of the mechanism shown in Fig. 13. Fig. 15 is a vertical section upon the line 15 15 in Fig. 13, said section showing a small portion of the upper feed-wheel and the whole of the lower feed-wheel, the latter being partly in elevation. Fig. 16 is a front elevation, upon an enlarged scale, of the twine-clamp, the knife, the clamping-jaws, and the several parts directly connected thereto for operating the said knife and the first clamping-jaw. Fig. 17 is a face view of a disk having two cam-races, one of which operates the second clamping-jaw and the other the knife. Fig. 18 is a detail view of the disk shown in Fig. 16, having a cam-race which operates the first clamping-jaw on the twine-clamp. Fig. 19 is a detail perspective showing the looper and tension-finger removed from the other parts of the knotting mechanism and the cam connection from the pivoted end of the looper to a lug on the spindle which carries the tension-arm, whereby the finger swings in a direction opposite to the vibration of the looper. Fig. 20 is a perspective view of the knotter, the knotter-spindle, and sleeve, and the stop mechanism thereon. Fig. 21 is a perspective view of the cast-off finger which strips the twine from the horn of the knotter, together with the slide carrying said finger and the arm which operates said slide, these parts being shown detached from each other and from the other parts of the machine. Fig. 22 is a detail perspective showing the bell-crank or elbow-lever which operates the latter. Fig. 23 is a transverse section upon the line 23 23 in Fig. 20, the point of view being below said line. Fig. 24 is a face view of the guide-plate with a part of the frame on which it is mounted. Fig. 25 is a plan view, on an enlarged scale, of the twine-clamp. Fig. 26 is a side elevation of one of the feed-wheels, the scale being considerably enlarged. Fig. 27 is a perspective view, upon an enlarged scale, of the frame of one of the tufting devices upon the feed-wheel in Fig. 26. Fig. 28 is a similar view of one of the tripping-heads on the tuft-receiving devices of the feed-wheel in Fig. 26. Fig. 29 is a like view of the trip-lever which holds the tripping-head until the moment of taking a tuft from the tuft-feed box. Fig. 30 is a perspective view of one of the rock-shafts which carry the tuft-withdrawing hooks which operate upon the release of the tripping-head. Fig. 31 is a perspective view, upon an enlarged scale, of one of the tuft-feed boxes with the mechanism directly connected therewith. Fig. 32 is a like view of the tripping-slide seen in dotted lines in Fig. 31. Fig. 33 is a like view of one of the tufts or tabs fed by the parts shown in Fig. 31. Fig. 34 is a longitudinal section of the tuft-feed box, taken upon the line 34 34 in Fig. 35. Fig. 35 is a transverse section of the same, taken upon the line 35 35 in Fig. 34, looking in the direction of the arrow. Fig. 36 is a sectional diagram showing the relative position of the lower feed-wheel, the looper, and the shuttle of the knotting mechanism at the moment when the needle has completed its downward stroke and risen sufficiently to form a loop in the twine which is caught by the twine-clamp between the latter and the first clamping-arm, the latter being dropped and the second clamping-arm upon the opposite side of the twine-clamp being closed. Fig. 37 is a similar diagram showing the position of the same parts after the needle has risen part way, the first clamping-arm being now closed upon the twine. Fig. 38 is a like diagram showing the needle at its upward limit of movement after its first passage through the mattress on one side of the tuft, the twine-clamp being at the end of its forward movement. Fig. 39 is a like diagram showing the same parts at the moment when the needle is descending to pierce the mattress on the other side of the tuft and draw the twine over the latter, the twine-clamp being upon its rearward stroke, the twine being drawn out to form a loop through which said twine-clamp can pass on its next forward movement and the second clamping-arm on the twine-clamp being dropped to enable the twine of the loop to pass between said arms and the body of the twine-clamp. Fig. 40 is a diagram showing the next succeeding position of the parts, the needle being at its lowest point and the second loop in the twine being caught by the twine-clamp. Fig. 41 is a diagram showing the next step, the needle having partly risen, the second clamping-arm having closed, and the cutter having severed the twine on the lower side of the twine-clamp. Fig. 42 is a diagram showing the next step, the mattress being held between the upper and lower feed-wheels with the two strands of twine passing through it, (the needle,) with the severed end of the twine in its eye, having risen to its limit of upward movement, the twine-clamp, still holding both the ends of the twine in its clamping-arms, being at about the middle of its backward movement, the tension-finger having moved up and the looper being thrown outward to draw the twine directly across the upper face of the knotter to enable the nose of the hook to catch the lower part of the loop in the twine. Fig. 43 is a diagram showing the second step in the formation of the knot, the clamping-arms of the twine-clamp having opened and released both ends of the twine, the looper having moved nearly back to its normal place to give slack for the knot, the knotter having made a complete revolution and formed the loop for the knot, its upper hook having stopped while the lower parts continue to turn to draw the released ends through the loop and the cast-off finger being about to move to throw the formed knot off. Fig. 44 is a diagram showing the final stop, the knotter being about to turn backward to throw off the loop, the mattress having been moved laterally into the line of movement it was in Fig. 36, and the knot being about to draw upward by the expansion of the compressed mattress. Fig. 45 is a plan view of the knot-forming mechanism, showing the parts in substantially the same position illustrated in the diagram in Fig. 42, save that the hook of the knotter is not as far advanced as in the diagram. Fig. 46 is a similar view of the same parts, their position being substantially that shown in Fig. 45, save that the knotter-hook has not made a complete revolution. Fig. 47 is a plan view of the same parts, the knotter-hook having completed a revolution after catching the two strands of twine. Fig. 48 is a plan view showing the final step in the operation of the knotting mechanism, the cast-off finger having thrown the formed knot off the hook of the knotter.

The reference-numeral 1 in said drawings indicates the uprights or posts of the supporting-frame of the machine, which are connected at the two ends of the frame by transverse sills 2 and beams 3. At their upper ends they are connected by arched or upwardly-curved braces 4. The structure may be of any preferred material, but iron is much the best.

Between the sills 2 and beams 3 is arranged a rectangular frame formed of angle-bars 5, which extend from end to end of the machine. These horizontal bars or rails lie near the rearward posts 1, their ends being supported by the two remaining members, which complete the frame. Between the said sills and beams and near the front posts is a second frame having upper and lower members 7 which approximately resemble T-shaped beams, the lower one being inverted. The upper and lower beams are connected to the sills 2 and beams 3 by bolts 8, and the upper beams 5 and 7 are connected together by horizontal transverse braces 9, Figs. 3 and 4, having angular extremities which are bolted to the said beams. These braces are arranged at equal intervals along the two beams 5 and 7, except over a limited space at each end.
Their upper edges rise somewhat at the middle portions, and lateral flanges 10 are formed along the edges of said braces, except at their middle portions. Upon the rising middle portion of each brace is seated an upright plate 12, which forms a support for parts described hereinafter.

I will speak of the angle-bars 5 and 7 in the following portions of this specification as "rails," as this term describes their function more accurately.

The rails 5 and 7 give support to wheels 13, which in turn sustain a rectangular frame 14. This frame is formed of U-shaped bars inverted, so that the wheels are journaled in their two vertical walls, as seen in Fig. 3. At equal intervals along said frame are arranged transverse bars 15, placed near the braces 9, each having a journal-bearing 16 at or near its middle. In this bearing is supported, at a small inclination from a horizontal plane, a short shaft or stud 17, which forms part of a feed-wheel 18, having upon its hub a rigid spur-gear 19, parallel with the feed-wheel or having the same inclination as the latter.
The construction of the wheel will be best understood from Fig. 15. Its shape is that of a hollow frustum of a right cone closed at the smaller end, which is adjacent to the spur-gear 19, and open at the larger end. The angle of divergence of the cone or frustum is the same as the angle of inclination of the axis, so that the upper side of each feed-wheel supported upon the frame 14 will always be horizontal as the wheel rotates. The teeth of the spur-gear 19 are cut at such an angle also that as they reach the point where they mesh they will be in horizontal line, as shown in Fig. 15. These feed-wheels are arranged at points corresponding with the longitudinal lines along which the tufts or tabs are to be applied to the mattress.

At four equally distant points upon the periphery 20 are formed two openings 21 of substantially circular form and arranged in lines which are parallel to the axis of the wheel and transverse to the periphery. These openings are separated by a narrow strip 22 in the circular line of the periphery 20. The means by which the tufts are periodically supplied to the feed-wheels and the tuft withdrawing and holding devices will be explained in their order, as I aim to describe the several mechanical parts as nearly as possible in the order in which they exercise their functions.

Each of the wheels 18 has its open side turned toward one of the vertical walls 12, and its inclination and location are such that its periphery 20 overhangs the upper end of the said wall 12, the latter being nearly in the same vertical line with the strip 22, between the openings 21. The whole series of feed-wheels is driven in unison by a corresponding series of pinions 24, mounted on a counter-shaft 25, which is supported in journal-boxes 26, mounted upon the rectangular frame 14 and bars 15.

The means for communicating motive power to the several parts of the machine will be described separately at the close of this specification.

An upper series of feed-wheels 27 is provided corresponding in number and in the form of the wheel with the lower series. The feed-wheels of the upper series are inclined at the same angle as those of the lower series. Their larger or open sides, however, are turned in the opposite direction, so that the lower side of the periphery of each wheel shall always be in a horizontal plane. The upper series of feed-wheels are so placed that their lower sides are directly over the upper sides of the lower wheel, as seen in Figs. 1 and 4. The wheels of the upper series are each carried by a short shaft 28, mounted in a journal-box 29, the latter being central upon a transverse brace 30. These braces are arranged between the two longer members of a rectangular frame constructed of two angle-bars 31, having in cross-section the form of an inverted U, Fig. 3. Upon the hub of each wheel is a spur-gear 32, having its teeth cut in the manner already described in connection with the spur-gears 19 of the lower series, Fig. 15. The gears 32 are driven by pinions 33, carried by a counter-shaft 34, which is arranged in boxes 35 at the two ends 36 of the frame and in auxiliary boxes placed on each of the braces 30. Each wheel has at each of four equally-separated points two openings 38, with two narrow intermediate slots 39, the construction being identical in these respects with that of the lower series of wheels.

The frame 14, which carries the lower feed-wheels, is provided at the ends with lugs 41, which hook around or lie upon the outer faces of vertical guide-bars 42, arranged upon the inner or adjacent faces of the four posts 1. The weight of the upper frame and its adjuncts is balanced, or nearly so, by heavy weights 45, placed in the tubular posts 1 and suspended by cords 46, which run over pulleys 47, journaled upon the upper ends of the posts, as in Figs. 1 and 3. The purpose of raising and lowering the frame carrying the upper feed-wheels is to enable the operator to introduce the end of the mattress between the upper and lower feed-wheels and to compress it between said feed-wheels to such a degree as may be necessary in order to feed the mattress forward. The means for raising and lowering said frame will be described in their order. The spur-gears on the hubs of the feed-wheels may, if necessary, be partly covered by hoods 48 to prevent any injury to the ticking or soiling of the same should it come in contact with the teeth of said gears when the mattress is compressed.

Each of the wheels in the lower series is arrested at the completion of each quarter-revolution by a latch 49, pivoted upon the frame 14 and engaging with a notch or seat 50 in the edge of the periphery, Fig. 5, so that the wheel is held positively at the exact point where it should remain while the tuft is placed upon its periphery. The latches 49 have their ends projecting beyond the front of the frame 14 and pivotally connected to a releasing-bar 51, which lies close to the frame, so that the longitudinal movement of said releasing device trips all the latches in unison and releases every feed-wheel at the same moment. The releasing-levers 51 are supported by their pivotal connection to the latch 49, and are operated to trip the latches by a lever 51ª, having a link connection to the releasing-bar. The latches also hold the wheels firmly while the needles operate.

Before explaining the mechanism by which the upper series of feed-wheels is raised and lowered I will describe the construction and operation of the parts by which the tufts are fed to and placed upon the feed-wheels during the period of rest which precedes the quarter-turn of said wheels, whereby said tufts are carried against the compressed mattress and held between the latter and the upper and lower series of feed-wheels in position while the tufting-needles and knotting mechanism accomplish their respective functions. I have illustrated in the drawings a single needle-operating mechanism in Fig. 1, a single tuft-feeding mechanism in Fig. 3 in connection with each of the two series of feed-wheels, and a single mechanism and upper feed-wheel in Fig. 4. As those not shown are merely duplicates of the parts shown in said figures their illustration is unnecessary for the purposes of this specification.

A tuft-feeding mechanism is shown in detail and upon an enlarged scale in Figs. 31 to 35, inclusive. It consists of a square tube 53, in which the tufts 54 are placed upon their edges and closely pressed together. Preferably the tufts are made in the form of a quatrefoil, as seen in Fig. 33, and they may be of any material that is suitable. The box or tube 53 has a casing 55, which incloses it upon three sides, the top being left open. Said casing has a bottom 56, which is dovetailed into a channel 57, formed in a base-plate 58, so that one of said parts may have a sliding movement in or upon the other. At its forward end the base-plate is provided with two laterally-extended lugs 59, having openings 60. This portion rests in the upper series upon the bar 31 at the front of the frame and is rigidly secured thereto by screws inserted through the openings 60 and tapped into the frame. A shoulder 61 upon the lower face of the base-plate 58 lies against the front vertical face of the bar and aids in holding the base-plate in place with the necessary rigidity. The parallel walls of the casing 55 are inclined to make a small angle with a vertical line, the inclination being the same as that of the feed-wheel. The longitudinal line also of the feed box or tube 53 is placed at such an angle to the bar supporting it that the exit end of said feed-box is parallel with the flared periphery of the feed-wheel. The arrangement is such that the side walls of said feed-box lie in the same inclined planes which coincide with the parallel sides of the feed-wheel to which said feed-box supplies tufts. There is one of these feed-boxes and mechanisms for each feed-wheel in both series and a description of one will be sufficient to give a complete understanding of all.

Within the feed-tube 53 is a push-bar 62, having a rack of teeth 63, which mesh with a pinion 64 on a shaft 65, which is journaled in bracket-plates 66 at the rear end of the feed-tube. Said bracket-plates form part of a slide-plate 67, arranged directly underneath the feed-tube 53 with a little space between. The metal of the base-plate 58 is cut away from a point just behind the shoulder 61 to the rearward end of the channel 57. In the channel thus formed hangs a lug 68, forming part of the bottom of the casing 55. At the rearward end of the feed-box casing is a second lug 69, into which is rigidly inserted the end of a bar 70, its other end being supported in the lug 68. Around this bar is coiled a spring 71, one end pressing against the lug 68 and the other end against a lug 72, which rises from the slide-plate 67. This lug moves easily on the bar 70, its forward movement increasing and its rearward movement diminishing the tension of the spring 71. The push-bar 62 rests upon a key-block 73, which is adjustable upon an inclined face on the rear end of the slide-plate 67, whereby an accurate mesh with the pinion 64 is secured, the key-block being then locked by a button 74, its main function being to permit ready removal of the slide-plate.

Upon the shaft 65 is a ratchet-wheel 75, driven with a step-by-step movement by a pawl 76, which is carried by an arm 77, mounted loosely on the shaft close to the ratchet. The arm 77 extends below the shaft 65 and its end is connected to a spring 78, Fig. 3, by which the arm is restored after each movement of the ratchet to the position where its pawl engages the next tooth for a further movement. By sliding the plate 67 forward the end of the arm 77 is brought into engagement with the end of a rod 79, adjustably mounted in a post 80, in which it is held by a set-screw 80ª. By adjusting this rod toward or from the pawl-carrying arm 77 it will be caused to act earlier or later upon the arm and will carry it over a greater or less arc, thereby giving the push-bar 62 a greater advance at each step. A pawl 81 is mounted on an arm 82 on one of the bracket-plates in which the shaft 65 is journaled and prevents lost motion of the ratchet. The end of the push-bar is provided with a head 83, which lies behind the tufts in the feed-tube and presses them forward, Fig. 34. When the feed-box is properly filled, the foremost tuft will always be pressed against stops 84, which are attached to the side walls of the casing 55, Figs. 31 and 35, their ends being bent at a right angle inwardly over the edges of said walls, so that they project slightly within the inner faces of the side walls of the feed-box 53, Fig. 35. These points 84 engage the laterally-projecting lobes of the quatrefoil and prevent the tufts from being pushed out of the feed-box by the push-bar 62. The stops 84 are bent inward through slots 85 in the edges of the feed-box, Fig. 34.

Upon the side of the base-plate 58, about midway of its length, is a laterally-projecting lug 86, in which is seated a pivot 87, upon which is fulcrumed a lever having a long arm 88, which extends beneath the base-plate to the other side of the latter, and a short arm 89, which makes an angle with the long arm of ninety degrees or somewhat more. The short arm is connected by a link 90 to a short sleeve or slide 91, adjustably mounted on a horizontal bar 92, the ends of which are rigidly secured for the feeders on the lower frame to the posts 1 at the front of the machine, said slide being fastened by a set-screw 91$^a$. For the feeders on the upper frame the bar 92 is movable vertically, its ends being provided with rolls 92$^a$, which bear against the faces of the posts 1, Fig. 6. The end of the long arm 88 is connected by a link 93 to a forked block 94, which is pivoted upon the end of a rod 95. This rod is movable in a channel 96 upon the side of the base-plate 58 and parallel with the feed-box 55, and its forward end extends somewhat beyond the forward end of said feed-box, Figs. 5 and 34. A spindle 97, which is longitudinally adjustable in supports 98, hanging from and integral with the slide 67, as seen in Fig. 34, serves to give the rod 95 the required forward adjustment. In rear of these supports a spring 99 is coiled on the spindle, its ends bearing against the rearward support 98 and a collar 100. A milled nut 101, screwed on the threaded end of the spindle, enables the operator to increase or relax the tension of the spring 99 and thereby draw the long arm 88 of the lever-arm back or permit it to move forward. During this adjustment the set-screw 91$^a$, Fig. 6, should be loosened to permit the slide 91 to be adjusted on the bar 92 to the new adjustment of the rod 95, as this slide is the device which arrests the forward movement of the rod 95. The function of the spring 99 is to continue the forward movement of the rod 95 after the feed-box 53 is stopped by the feed-wheel.

The tuft-feeding mechanism thus described is duplicated for each feed-wheel in both upper and lower series, the feed devices for the lower series being mounted on the frame 14. I will now explain the parts upon each feed-wheel which withdraw the tufts from the exit end of the feed-box 53 over the end of the stop 84 and by which said tufts are held upon the feed-wheels in proper position to enable the tufting-needles to do their work.

Referring to Figs. 3, 5, 6, 13, 14, and 15 and to Figs. 26 to 30, inclusive, each feed-wheel is provided with four sets of tuft-withdrawing devices arranged at intervals of ninety degrees or quarter of the circumference upon the flared flange 20. These devices consist of a plate 103, lying upon the flange and secured by screws. In this plate are formed two substantially circular openings 104, which register with the openings 21 in the periphery 20. Between the openings 104 a space 105 is formed equal in length and width to the length and width of the strip 22, with which it coincides. In the meeting faces of the periphery 20 and plate 103 are formed half-round channels which give bearing, when the two are brought together, to two short small rock-shafts 106. (Shown in dotted lines in Fig. 15 and in detail in Fig. 30.) The ends of these shafts project beyond the edge of the periphery 20 which adjoins the back or closed side of the wheels, and they are bent to form cranks 107, Fig. 30. The rock-shafts 106 lie parallel with each other on opposite sides of the openings in the wheel and plate and transverse to the periphery 20. Their cranks 107 are so placed that they lie nearer each other than the shafts, and they rest against the opposite sides of a neck 108, which projects centrally from the end of a plate 109, and in notches 110, formed by cutting away the metal of the plate to form said neck. Upon the end of the latter is mounted a head 112, having the form of a segment of a disk, Fig. 28. The plate 109 lies in a radial slot 113 in the back of the wheel. It is provided with a longitudinal slot 114, at the end of which next the head 112 is a lug 115, which projects outward at a right angle to the plate. The latter is retained in place by a U-shaped frame 116, the two arms of which lie across the plate 109. The frame 116 is secured on the back of the wheel by screws, and upon the edge of the arm farthest from the periphery is an inwardly-turned lug 117. A coiled spring 118 rests on this lug and pushes against the lug 115, this outward push on the plate 109 being resisted by a stop-pawl 119, pivoted on the frame and held by a spring 120 in a notch 121 in the edge of the plate. The pawl 120 is rigid, with a tripping-arm 122, which lies in the open space between the arms of the frame, its projecting end having a plate 123, which is substantially parallel with the axis of the wheel. This plate lies in line with the rod 95, by which it is operated at the proper moment to trip the pawl 120 and release the plate 109. The spring 118 thereupon drives said plate outward, and the crank-arms 107 being thereby separated the rock-shafts 106 are turned a part of a revolution. Upon each shaft 106 is a hooked finger 124, the sharp point of which is turned away from the other rock-shaft. The movement of each of the latter under the impulse of the spring 118 and at the moment when the tuft in the end of the feed-box is brought close to the sharp points of the fingers, the latter are struck into body of the tuft and by their hooking engagement obtain a strong hold, which enables them to draw the tuft over the inwardly-projecting points 84. When the tuft has been taken from the feed-box in this manner, it is held by the hooked fingers 124 until the plate 109 is restored to its original position, with the pawl 119 lying in the notch 121. This restoration is effected by the pressure of the mattress upon the head 112, as the feed-wheels make their quarter-turn after the tufts have been taken from the feed-box. This quarter-turn brings the heads 112 upon the two plates 109 in the lower and upper series of feed-wheels upon the opposite faces of the mattress. The feed-wheels are adjusted to compress the mattress, and the heads 112 are projected by the springs 118 considerably beyond the peripheries of said wheels, so that they are forced back until the cranks 107 are drawn against the neck 108, the hooks 124 being at the same time withdrawn from the tuft. The latter being now held between the periphery of the wheel and the face of the mattress, it is retained in its place until the stitching and knotting mechanisms have accomplished their functions and securely tied the tufts in place upon both sides of the mattress. I will now explain the manner in which the tuft-feeding devices are operated to advance the feed-boxes to the peripheries of all the feed-wheels simultaneously in both series.

In the operation of the tufting-needles, which will presently be explained, it will be readily understood that after the needles carry the twine through the mattress the first time and upon one side of the tufts they must be enabled to make the second stroke upon the other side of the tufts in order to carry the twine across the tufts and secure them in their places. To do this, I cause the mattress to move sidewise between the first and second strokes of the tufting-needles, which necessitates a like movement of the feed-wheels and of the two frames upon which they are supported. As the means by which this movement is accomplished will be described immediately, I will only say that I utilize it to operate the tuft-feeders by means of the link attachment of the short arms 89 of the levers beneath the feed-boxes to the horizontal bars 92. The slides 91 being rigidly locked on these bars, while the base-plates 58 of the feeders are screwed to and move with the frames carrying the feed-wheels and the short arms 89, lying nearly at right angles to said bars 92, the lateral movement of the frame draws upon said arms 89 and throws the long arms 88 toward the exit end of the feed-box. This movement darts the rod 95 forward, and as the hangers 98 are upon the bottom of the slide-plate 67, Figs. 31 and 34, it also presses the spring 99 against the rearward hanger 98 and presses the slide-plate forward. This in turn causes the lug 72 to push against the spring 71, and the latter, pushing against the lug 68, drives the feed-box 53 forward until the tuft next to the mouth of the feed-box is in reach of the hooked fingers 124. At this moment the end of the rod 95 abuts upon the plate 123 and operates the tripping-lever 122, which releases the plate 109, by which the rock-shafts 106 are turned. The points of the hooked fingers strike into the tuft, and as the frames move back to their original position the link connections 90 push upon the short arms 89 and swing the long arms 88 backward, thereby causing the lug 72 to press against the lug 69 and retract the feed-box 53. As this latter movement takes place the rod 79 abuts upon the end of the pawl-carrying lever 77 and gives the ratchet 75 a step movement, by which the pinion 64 is caused to advance the push-bar 62 and feed the tufts 54 forward in the feed-box 53. By adjusting the rod 79 in its support this feed can be increased or diminished.

The lateral movement of the frames which carry the feed-wheels is produced by the following means: Each of the four guide-bars 42, which lie against the inner faces of the uprights 1, is movable thereon in unison with the lower and upper frames. The upper frame is provided with lugs and projections, which engage with the guide-bars 42 in the manner already described in connection with the lower frame. Said guide-bars have movement with the two frames and slide upon the flat inner faces of the posts 1 as the frames move to give the required side displacement of the mattress, which is compressed between the two series of feed-wheels. The side movement is given at the proper moment by a bell-crank lever 127, having a fulcrum 128 upon the rail 7 of the lower frame. The end of its vertical arm has a friction-roll 129, which lies between blocks 130 on the front bar of the lower frame. The forked end of its horizontal arm has a toggle connection 131 to a crank-arm 132, which projects from a sleeve 133, mounted on a stud 134 on the rail 3. The toggle 131 has its two ends jointed to turn at right angles one to the other in order to allow for the side movement and for the throw of the crank-arm 132. The means by which the sleeve is rocked at intervals will be described in connection with other parts of the driving mechanism.

The several needle-operating mechanisms are all duplicates one of another. One of these is shown in Fig. 1. It consists of a needle-bar 135, in which the end of the needle is clamped. It reciprocates in a vertical guide 136, rigidly mounted on triangular brackets 138, which extend rearward from an angle-bar 139 on the front posts 1. The needle 140, which is best seen in Figs. 36 to 42, is similar to the ordinary straight sewing-machine needle, save that it is much longer. It is threaded with twine 141, taken from a roll 142 and carried through suitable tension devices 143, from which it is taken to the needle and threaded through its eye, The needle is reciprocated by an arm 144, which is vibrated by a rock-shaft 145. The means for causing this vibration will be described in their order.

The mattress is introduced between the upper and lower feed-wheels, which are separated for this purpose by raising the upper series. This is done by bevel-gears 145$^a$, Fig. 2, carried by a shaft 146, extending from end to end of the machine and journaled in bearings upon the top of heavy slide-plates 147, arranged between the guide-bars 42, and having ribs 148 upon their edges, which move in the vertical grooves in said guide-bars. The cords 46 are connected to these slide-plates. The bevel-gears 145$^a$ mesh with bevel-pinions 149, having threaded shafts 150, journaled in bearings 151 just beneath the pinions and having screw engagement with lugs 152, which form part of slides 153. These slides move in vertical guides 154, which are integral with the slide-plates 147. Upon the slides are pivotal supports or wrists, the ends of which lie in vertical slots 156 in the slide-plates 147. Upon the ends of the shaft 146, next to the bevel-gears 145$^a$, are cranks 157 by which the shaft may be operated to raise the upper feed-wheels, and when the end of the mattress is inserted to lower said feed-wheels to the proper point. This also enables the machine-operator to adjust the feed-wheels to mattresses of different thicknesses. When these preliminary steps have been taken and after the machine is started, the mattress is fed forward to the point where a line of tufts is to be applied and the feed movement being arrested at that point the upper series of feed-wheels is caused to approach the lower in order to compress the mattress at the points where the tufts are attached. The compressing adjustment is effected by toggle-joint levers 158, one end of each lever being connected to a wrist on the slide 153 at one end of the machine. The lower arm 159 of the lever is jointed at two points 160, the axes of both joints being at a right angle to the axis of the joint connecting the lower arm 159 to the upper arm, so that the side movement of the mattress and feed-wheels can take place. The lever-joint is on a crank-pin 161 on the end of a crank-arm 162, which is journaled in a bearing 162$^a$ on the end of the lower feed-wheel frame, as seen in Fig. 5. It will be understood that this compressing mechanism is provided at both ends of the machine. The mattress having been fed to the right point and stopped the compressing mechanism operates and at the same time the tufting-needles 140 descend and pierce the mattress close to the sides of the tufts. The latter having been drawn from the feed-boxes 53, driving the next preceding stoppage of the feed-wheels and caught by the hooked fingers 124, are now, as the needles descend beside them, closely pressed against the face of the mattress and the hooked fingers are withdrawn. After the needles make their first stroke the twine is caught by a part of the knotting mechanism, presently to be described, and the needles rise, leaving a strand of twine in the mattress. The latter is now moved sidewise just far enough to permit the needles to pass down on the other side of the tufts, thereby drawing the twine directly over and across the upper faces of the tufts, as seen in the diagrams Figs. 40 to 44, inclusive. The second stroke of the needles having been made and the needles withdrawn, leaving a second strand of twine passing through the mattress, the knotters will now perform their functions by tying an overhand knot in the ends of both strands of twine, said ends extending a suitable distance below the lower surface of the mattress. The tying of this knot, which is the last step in the tufting process, is performed by automatic mechanism which I will now describe.

The knotting mechanism is shown in Figs. 13 to 25, inclusive, and in Figs. 45 to 48. The formation of the knot is illustrated in sectional diagrams in Figs. 36 to 44, inclusive, and the knotter-head and twine-clamp are shown in plan views in Figs. 45 to 48. The parts chiefly concerned in the formation of the knot are a vibrating twine-clamp and a revolving knotter-head. These parts, together with those coöperating, are mounted upon the plates 12, Fig. 15, which rise vertically from their supports, their upper edges coming within the open sides of the lower feed-wheels, their upper edges lying nearly beneath the dividing-line between the two openings 21 in the periphery 20 when said openings arrive at the highest point of revolution. The construction and inclined position of the feed-wheel 18, as shown in Fig. 15, enables the lower part of the plate 12 to lie outside the periphery 20, while the remaining portion lies more or less within the same.

Upon a substantially central pivot 165 is mounted a plate 166, having upon its upper end a twine-clamp 167, the latter being shown in detail and upon an enlarged scale in Fig. 25. The upper portion of said plate 166 is forked to form two jaw-plates 168 and 169, which are integral parts of the twine-clamp. Upon the outer face of the plate 168 is arranged a clamping-jaw 170, and in similar relation to the plate 169 is a second clamping-jaw 171. Both clamping-plates lie in countersunk recesses, so that their outer surfaces are flush with the body of the twine-clamp, and both are pivoted upon a bearing 172, which lies near the heel of the twine-clamp. Each plate has a tailpiece 173, Fig. 16, projecting somewhat beyond the heel and provided with a pivotal connection for an operating-rod. The rod 174 is connected to the clamping-plate 170, and a similar and independent rod 175 is connected to the tailpiece of the clamping-plate 171. The first rod 174 has its lower end connected by a link 176 to a lug 177 upon the lower edge of the plate 166, beneath and upon one side of the pivot 165. The rod 175 has a similar link 178 connected pivotally to its lower end and to the same pivot on the lug 177. The pivot-pin 179, which connects the link 176 to the rod 174, is extended at its outer end to lie in a cam-race 180 in a cam-disk 181, Fig. 18, which is centrally mounted on the pivot-bearing 165. The pivot-pin 182 at the junction of the rod 175 and the link 178 lies, in like manner, in a cam-race 182 in a disk 183, placed next to the outer face of the plate 166 and on the pivot 165, Fig. 17. Integral with the plate 166 and at a right angle therewith, or nearly so, is an arm 184, by which the twine-clamp is vibrated, the mechanism employed for this purpose being explained hereinafter.

In a central opening 185 between the two jaw-plates 168 and 169 of the twine-clamp is a knife 186, which is pivoted upon the same bearing 172. Near its free end it is connected to a link 187 and by the latter to an operating-bar 188, the lower end of which has a pin 189 lying in a channel 190, which extends from a point just above the bearing 165 to the upper end of the solid portion of the plate 166, beneath and a little on one side of the pivot 172. The pin 189 extends into a cam-race 191 in the disk 183, which lies upon the side of the twine-clamp plate 166 farthest from the plate 12, Fig. 15. The disks 181 and 183 have each an arm 192 and 193, respectively, having openings 194 for the attachment of operating-rods, which will be described hereinafter.

The twine-clamp oscillates close to the outer face of the plate 12 and just below its edge, its vertical plane being substantially coincident with the side of the opening 21 lying nearest the open side of the feed-wheel 18. At or about the center of the plate 12 a vertical needle-groove 195 is formed in its outer face, Figs. 45 to 48, and the arc of vibration of the twine-clamp extends about equally on both sides of this groove.

Just in front of the plate 166, which carries the twine-clamp, is a horizontal frame 196, in the center of which is a bearing for a bushing 197, which carries a knotter-head 198, the latter lying just above the frame 196. In the bushing 197 lies a spindle 199, which passes through the knotter-head and carries upon its end a knotter-hook 200. The spindle 199 extends downward and has a bearing in a second horizontal frame 201. The end of the spindle below the frame 201 has a bevel-pinion 202, meshing with a bevel-sector 203, the latter carried by an arm 204, mounted on a pivot-bearing 205. A lever-arm 206 projects from the arm 204, its end being connected to an operating-rod in the manner described hereinafter.

The knotter head and hook are independently turned, the latter by the sector and pinion 203 and 202 and the former by means which I will now explain.

The knotter-head 198 consists of a circular body concentric with the spindle 199. It has a groove or channel 207, which begins at the outer edge of the said circular body, Fig. 20, and winds spirally with a small ascending angle a little more than a complete turn around the axis with a gradual approach toward the latter. Its upper face is flat and eccentric, and through it the spindle 199 projects, the hook 200 being mounted on its ends. The end of the hook secured to the spindle 199 is concentric with the latter, and the hook curves from its point around nearly half the circumference of the knotter-head and parallel with the same before it unites with the spindle, Figs. 45 to 48. Upon its lower face the hook is cut away from a point near its end to the point of union with the spindle, thus forming near its point a shoulder 208, Figs. 15 and 20. At the highest end of the groove 207 is an upwardly-projecting lug 209, which lies in the path of the shoulder 208.

It will be seen in Figs. 13, 15, and 20 that a channel or open space 210 is provided between the flat top of the knotter-head and the parallel lower face of the knotter-hook. It should be noted also that from the point where the channel 207 unites with the periphery of the circular body of the knotter-head, as in Fig. 20, the spiral wall of said channel is vertical for some distance. Just before it reaches its highest point also the overhanging wall of the said channel disappears, Fig. 20.

Upon the lower end of the bushing 197 is a fixed collar 212, between which and the frame 196 is a flat ring 213, loose on the bushing and of less exterior diameter than the fixed collar 212. From the flat ring a tooth 214 projects as far as the outer edge of the collar. On said collar a stop-lug 215 is formed, rising higher than the face on which the flat ring 213 rests and causing the latter, therefore, to turn with it whenever the stop-lug engages the tooth 214. On the lower face of the frame 196 is a hanging stop-pin 216, which arrests the tooth 214 when the latter is turned in either direction far enough to engage the pin. The stop-lug 215 being then brought against the tooth, the revolution of the knotter-head will be arrested. Beneath the collar is a segmental plate 217, loose on the spindle 199, but connected to said collar by a screw 218, lying in a curved slot 220 in the plate. A spring 221 is coiled on the spindle, its end connected to a short sleeve 222, which is locked on the spindle by a set-screw 223, Fig. 20. The upper end of the coiled spring is connected to the fixed collar 212, Figs. 15 and 23. The functions of these parts will be described in connection with the diagrams in Figs. 36 to 44.

Upon the upper face of the horizontal frame 196 is a slide 224, (shown in detail in Fig. 21,) the end portions having ribs 225, which move in a channel and guide the same. The part between the ribbed portions is extended outward and brought in front of the knotter-head, and at its central point a finger 226 rises vertically from the outer edge, its sharp end 227 being bent at a right angle inward or toward the plate 12 and then laterally, Figs. 47 and 48. The arrangement of this finger is such that when the slide is moved in the direction in which the point of the finger is turned said finger will enter and pass through the channel 210, Fig. 15. The slide 224 is operated by a straight arm 228, having a pivotal support 229 on the frame 201, Fig. 13, its slotted end being engaged by a pivot-pin 230 on the edge of the slide 224. The arm 228 is itself thrown forward to move the slide by a bell-crank lever 231, pivoted at its angle upon the support 229. The end of the vertical arm of said bell-crank lies behind a pin 232, which projects from the face of the arm 228 and is held against it by a spring 233. The end of the horizontal arm of the lever 231 has a small friction-roll 234 on a pin or stud 235, which projects from the outer face of said arm. On the outer face of the sector-gear 203, which meshes with the bevel-pinion on the spindle 199, is a sector-plate 236, on the inner face of which is a cam-plate 237, (shown in dotted lines in Fig. 13,) so formed that as the sector-plate moves forward the friction-roll 234 will ride on the upper edge of the cam-plate without operating the bell-crank lever or the straight arm 228. As the sector returns, however, to its original position the friction-roll 234 will be caught by the lower edge of the cam-plate 237 and the operative stroke of the arm 228 will be made, whereby the slide 224 will be thrown into the position shown in Fig. 48. This movement casts off the formed knot from the knotter-hook and is the final step in the tufting process. The arm 228 is restored to its normal place by a spring 228ª.

Directly over the knotter-hook is a looper 238. (Shown in Figs. 13, 14, 15, 19, 45, and 46.) It is curved in the arc of a circle and mounted on the end of a vertical arm 239, which has a horizontal extension to one side, and is then bent toward the plate 12, its inward end having a hub 240, which finds bearing upon a stud 241, Fig. 13. In the end of the looper 238 is an opening 242, which lies normally with its inner end directly over and in line with the needle-groove 195 in the plate 12. The looper is vibrated by means presently to be described. Just over it and lying normally in a vertical plane nearly coinciding with the outer side of the knotter-head is an arched finger 243, Fig. 19, having at one end a cross-head 244, one extremity of which is mounted on a spindle 245, which has bearing in the plate 12, Figs. 13 and 14, and extends downward as far as the hub 240 of the looper. Upon the lower end of the spindle is a short lever 246, projecting through an opening 247 in the plate 12 and lying beneath the edge of a cam-lug 248 on the hub 240. A spring 249, connected to the outer end of the cross-head 244 and to a guide-bracket 250 on the frame 196, keeps the lever 246 against the cam-lug 248 and holds the finger 243 in its normal position. (Shown in Figs. 15 and 36.)

Both series of feed-wheels are turned in unison a full quarter-revolution at each movement, this being effected by a vertical shaft 251, Fig. 2, mounted in bearings 252 upon each of the end plates 147. These shafts are provided with lower bevel-gears 253, which are fixed, and with upper bevel-gears 254, which are splined on said shafts, so that they may move up and down with the upper series of feed-wheels. Upon each end of the shaft 34, which carries the spur-gears 33, is a bevel-pinion 255, which meshes with the gear 254. Similar pinions 256 are provided upon the shaft 25, which carries the spur-gears 24. On the shaft 251 is a ratchet-wheel 256ª, having four equally-separated teeth. Beneath the ratchet is loosely mounted a pawl-carrying arm 257, (see lower part of Fig. 2,) having a pawl 258, which is thrown by a spring into the teeth of the ratchet. An operating-rod 259 is connected to the arm 257 at one end and at the other end to a lever 260, fulcrumed on a stud 261 on the end frame of the machine. On the lower end of the lever 260 is a laterally-projecting pin having a friction-roll 262, which lies and is held by a spring 263 against the face of a cam 264, Fig. 12. This cam is part of the face of a large gear 265, carried by a shaft extending along the lower front of the machine. The gear is driven continuously by a worm 266, having its shaft bearing in a long box 267. The pulley 268 on the worm-shaft is loose and the machine is brought into operation by a clutch 269. The rod 259 is provided with a turn-buckle 270, so that the length may be accurately adjusted to mesh the pawl 258 with the ratchet with as little lost motion as possible.

The lever 158 159, which lowers and raises the upper series of feed-wheels to compress the mattress and release it, is operated by a lever 271, mounted on a rock-shaft 272 and pivotally connected to the lower end of the arm 159. On the rock-shaft 272 is an arm 273, having a projecting pin 274 on its end, on which is a roll 275. This roll lies in a cam-race 276 in a disk 277, Fig. 2, which forms part of the gear 265. On the same pin 274 is mounted the end of an operating-rod 278, the upper end of which connects with a crank-arm 279 on the shaft 145, by which the needle-operating arms 244 are vibrated. The cam-race, it will be noted, is substantially symmetrical, and to make its action perfectly clear I have indicated the continuously-concentric portion by the letter $a$, and the two remaining parts, which are substantially duplicates one of another, I have denoted by the letters $a'$ $a^2$ and $a^3$ $a^4$. The concentric portion $a$ is the part of the race which holds the needle-arms in a raised position while the knotters do their work and until the mattress is fed forward to the point where the next line of tufts is to be applied. The part $a'$ is that portion of the race which raises the connecting-rod 278 and throws the needles down for their first stroke, as shown in Fig. 36. The part $a^2$ is that portion of said race which raises the needles to the position shown in Fig. 38, during which movement the lateral displacement of the mattress takes place by which the feed-wheels are brought to the position seen in Fig. 39, at which instant the needles are about to pierce the mattress on their second stroke. This stroke is made by the action of the remaining portion $a^3$ of the race. The needles are then raised by the part $a^4$ and pass thence into $a$ again.

The looper 238 is vibrated by a connecting-rod 279, its upper end being connected to a wrist 280 on the inwardly-extending portion of the arm 239. The lower end of the rod connects with a lever-arm 281 on a rock-shaft 282$^a$, which has a limited movement given it by an arm 283, provided with a friction-roll 284, which lies in a race 285 in a cam-disk 286, Fig. 10.

The jaw 170 on the twine-clamp is operated by the connecting-rod 174 and by the cam-race 180 in the disk 181, as already described. The disk 181 is operated or turned upon the bearing 165 by a rod 287, connected to the opening 194 in its arm 192 and to a lever-arm 288 on the rock-shaft 288$^a$, Fig. 7. The latter shaft has an arm 290, provided at its end with a roll lying in a cam-race 291 in a disk 292, said disk being carried by the shaft.

The clamping-jaw 169 is operated through the disk 183 by a rod connected to the arm 193 and to a lever-arm 293$^a$ on a rock-shaft, which is provided with a second arm 295, having a roll lying in a cam-race 297 in a disk 298. This disk is carried by the shaft 282.

The twine-clamp is vibrated by a rod 299, connected to the end of the arm 184 and to a lever-arm 300. The latter projects from a rock-shaft 301, which has an arm 301$^a$, provided with a roll lying in a race 302 in a disk 303. This disk is also carried by the shaft 282.

The sector-gear 203 is operated by a rod 304, connected to the arm 206 and to a lever-arm 305 on a rock-shaft 306, said shaft having a lever-arm 307, provided with a roll lying in a cam-race 309 in a disk 310, the latter being upon the same shaft 282 with the disks already described. (See Fig. 4.) The several rock-shafts, however, are independent one of another and extend from end to end of the machine, each rock-shaft having as many separate levers as there are separate mechanisms to be operated.

It only remains for me to briefly describe the knot formation as shown in the diagrams of Figs. 36 to 44. In the first of these diagrams I have shown the needle after it has been driven through the mattress on one side of a tuft and has slightly risen to form a loop in the twine. This loop is caught by the twine-clamp 167, which is at that instant moving in the direction its point is turned, its clamping-jaw 168 and knife 186 being dropped, so that the loop passes between them and the twine-clamp. The jaw 169 remains closed, so that the loop passes outside it. In the next diagram the needle has risen far enough to clear the lower feed-wheel, and before it can go higher and draw the twine from its eye or out of the space between the twine-clamp and the jaw 168 the latter closes and holds the end securely. The needle now rises to its upward limit and the lateral movement of the mattress begins in order to carry the twine over or across the tuft, as shown in Figs. 39 and 40, the latter figure showing the second position, with the needle down, this being its second stroke. While descending, but before it can reach the opening in the lower wheel, the looper 238 is thrown outward, drawing the twine out with it, and forming a suitable "slack," this being aided by the finger 243, which swings inward and holds the twine as the feed-wheel begins to move in the same direction with the looper. This action is shown in Fig. 29. It enables the needle to make its second stroke, as in Fig. 40, with sufficient slack or a second loop without drawing the twine over the face of the tuft, which might cause it to cut into the edges of the latter and would probably injure its appearance. The second stroke having been made and the needle having thrown out a second loop, as in Fig. 40, the latter is caught between the twine-holder and the clamping-jaw 169, and as the twine-holder continues its stroke this jaw closes, as in Fig. 41. The looper 238 now moves outward again, as in Fig. 42, drawing both strands of the twine directly across the middle point of the knotter, (see also Fig. 45,) making an upper and a lower double strand. The knotter-hook 200 catches the lower of these two strands, and as it turns so as to carry its point in a direction opposite to that of the twine-holder the lower double strand of twine is drawn against the lug 209 and into the spiral channel 207. The knotter-head, it will be noted, derives its rotary movement in one direction from the bushing 197 and its collar 212 and in the other direction from the coiled spring 221. As therefore the hook 200 again comes around to the twine-holder, the knife 186 has severed the twine and both jaws 168 169 have been opened, as in Fig. 43. Meantime and just before this has taken place the knotter-hook has begun to turn backward, and as the shoulder 208 comes against the lug 209 the cut ends of the twine are caught between them. As the retrograde movement begins the slide 224 begins to move and the point 227 of its finger 226 catches the loop of double twine, which lies partly in the channel 207 and partly in the channel or space 210. The finger moving in one direction and the lug 209 and shoulder 208 in the opposite direction, the loop of twine is drawn off by said finger and passes over the top of the knotter-hook, while the cut ends of twine caught between the lug 209 and shoulder 208 are drawn through the loop, or, to speak more accurately, the said ends are carried through the loop and the latter is at the same moment carried over the cut ends. The twine being cast off the knotter by the finger 226, the release of the mattress by the feed-wheels, and the consequent expansion of the mattress, draws the knots tight and completes the tufting operation.

The lateral displacement of the mattress between the first and second strokes of the needles is produced by a cam-race 312, Fig. 3, in a cam-disk 313, carried by the shaft 282. In this race lies a roll on the end of the arm 132, which is mounted on the stud 134. To the same end of the arm is connected the toggle-lever 131, as already explained.

What I claim is—

1. In a mattress-tufting machine, the combination with feed-wheels for advancing the mattress, tuft-holding boxes in operative connection with the feed-wheels, and means for moving said boxes toward and from the feed-wheels, of hooked tuft-withdrawing devices, movably mounted in the feed-wheels and constructed to withdraw the tufts from the tuft-holding boxes, and devices for causing the hooked tuft-withdrawing devices to advance and recede relatively to the periphery of the feed-wheels, substantially as described.

2. In a mattress-tufting machine, the combination with a series of feed-wheels, each having suitable needle-openings in its periphery, of a series of tuft-feeding boxes movable toward and from said wheels, means for automatically advancing the tufts in said box, spring-turned rock-shafts one on each side of each pair of needle-openings, said shafts having hooked fingers, means for releasing the same, and movable heads operated by the pressure of the mattress to restore said shafts to their position, substantially as described.

3. In a tufting-machine, the combination with a feed-wheel having needle-openings in its periphery, of rock-shafts on opposite sides of said openings having hooked fingers, a spring-pressed plate acting on cranks on said shafts to turn the hooked fingers away from each other, when released, said plate having a head upon its outer end to engage the mattress, and means for automatically releasing said plate, substantially as described.

4. In a mattress-tufting machine, the combination with a feed-wheel having a flared periphery open on one side and provided with needle-openings, of rock-shafts one on each side of said needle-openings, an outwardly-pressed plate acting on cranks on said shafts, a pawl on a tripping-lever to hold the plate in its inward position, a tuft-feeding box movable toward and from the wheel, and a slide-bar carried on said box and automatically projected to trip the pawl and release the plate, substantially as described.

5. In a mattress-tufting machine the combination with an upper and lower series of feed-wheels each having a flared periphery shaped like a hollow frustum of a cone each feed-wheel being mounted upon a shaft inclined at an angle with the horizontal equal to the angle of divergence of the said frustum so that the lower and upper portions of the upper and lower feed-wheels are parallel, and horizontal of knotting mechanism lying beneath the upper portions of the peripheries of the lower feed-wheels, and a series of tufting-needles arranged above the lower portions of the peripheries of the upper feed-wheels, needle-openings being formed in the peripheries of both upper and lower feed-wheels, substantially as described.

6. In a mattress-tufting machine the combination with an upper and lower series of feed-wheels, having flared peripheries shaped like frusta of hollow cones and mounted upon shafts inclined to the horizontal at an angle equal to the angle of divergence of said frusta, of an upper and lower frame carrying said feed-wheels, a series of tufting-needles, a series of knotters partly within the lower series of feed-wheels, and means for imparting a sidewise movement to said upper and lower frames, the peripheries of the feed-wheels being provided with needle-openings, substantially as described.

7. In a tufting-machine, the combination with an upper and lower series of feed-wheels, of two corresponding series of tuft-feeding boxes, means for moving both series of feed-wheels sidewise and means operated by said sidewise movement for advancing said feed-boxes toward the feed-wheels at stated intervals, substantially as described.

8. In a tufting-machine, the combination with an upper and lower series of feed-wheels, of a double series of tuft-feeding mechanisms, tuft-withdrawing devices mounted on the peripheries of said wheels, means for giving a simultaneous sidewise movement to both series of feed-wheels, and devices for advancing the tuft-feeding boxes and releasing the tuft-withdrawing mechanism by said sidewise movement, substantially as described.

9. In a tufting-machine the combination with an upper and lower series of feed-wheels of spring-actuated tuft-withdrawing mechanisms upon the peripheries, means for giving a sidewise adjustment to both series of feed-wheels simultaneously, and devices for releasing the tuft-withdrawing mechanisms and advancing the tuft-feed boxes by the sidewise adjustment of the feed-wheels, substantially as described.

10. In a tufting-machine the combination with a double series of laterally-movable feed-wheels of two series of tuft-feeding mechanisms having movable feed-boxes, spring-actuated tuft-withdrawing devices on the peripheries of said wheels, means for automatically releasing the said devices, and means for restoring the same to place, under their normal actuating spring-pressure, substantially as described.

11. In a tufting-machine, the combination with a double series of feed-wheels having spring-operated tuft-withdrawing mechanisms on the peripheries of said wheels, of two series of tuft-feeding mechanisms having feed-boxes movable toward and from said wheels, means for moving said wheels laterally at intervals, means operated by said movement to release the tuft-withdrawing mechanisms and to advance the feed-boxes, a series of automatically-operated tufting-needles arranged above the feed-wheels, and a series of knotters beneath the upper peripheries of the lower feed-wheels, substantially as described.

12. In a tufting-machine, the combination with a double series of feed-wheels each having a flared periphery open on one side of the wheel and provided with needle-openings, of tuft-withdrawing, spring-actuated rock-shafts having hooked fingers arranged on opposite sides of said needle-openings, tuft-feeding boxes movable toward and from the feed-wheels, a series of tufting-needles and automatic means for releasing the rock-shafts by the forward movement of said boxes, substantially as described.

13. In a tufting-machine the combination with a double series of feed-wheels having flared peripheries and open on one side, of tuft-withdrawing, spring-actuated rock-shafts arranged on opposite sides of needle-openings in the wheel-peripheries, tuft-feeding boxes movable toward and from the feed-wheels, means operated by the forward movement of said boxes for releasing the rock-shafts, a series of tufting-needles, mechanism for moving the two series of feed-wheels sidewise between the first and second strokes of said needles, and a series of knotters arranged partly within and just beneath the upper portions of the peripheries of the lower series of feed-wheels, substantially as described.

14. In a tufting-machine the combination with one of a series of mattress-feeding wheels having needle-openings in their flared peripheries, of two rock-shafts having hooked fingers one of said shafts being placed on each side of each needle-opening, a spring-actuated plate movable in a radial line and having notches beneath a projecting head to receive cranks on the ends of the rock-shafts, a pawl to hold said plate under spring-pressure with the cranks lying in its notches, a lever to trip the pawl, a series of tuft-feeding boxes movable toward and from the feed-wheels, and means operated by said movement to trip said lever, substantially as described.

15. In a tufting-machine the combination with one of a series of feed-wheels each having a periphery provided with needle-openings, of rock-shafts placed on the sides of said openings and provided with hooked fingers the points of which turned away from the openings, spring-projected plates movable radially and having notches to receive the cranked ends of said rock-shafts, pawls to retain said plates in retracted position with their springs under tension, tripping-levers to hold said retracted plates, and means for automatically operating said tripping-levers, substantially as described.

16. In a machine for tufting mattresses the combination with an upper and lower series of feed-wheels having needle-openings in their peripheries, of rock-shafts on opposite sides of said openings provided with hook-shaped fingers having their points turned away from said openings, plates connected with cranks on the rock-shafts and having heads that project beyond the peripheries of the feed-wheels, levers pivoted on said feed-wheels and having pawls to engage notches in said plates to hold them in a retracted position against spring-pressure boxes mounted opposite said feed-wheels to contain tufts, each box having an adjustable rod, means for causing said boxes to approach and then recede from the feed-wheels whereby said rod can trip the lever, disengage its pawl, release the plate which operates the rock-shafts causing the hooked fingers to engage tufts placed on the feed-wheels, a series of tufting-needles, means for moving the mattress sidewise between two successive strokes of said needles, a series of knotters to tie the twine and knives to sever the same after tying, substantially as described.

17. In a tufting-machine the combination with means for compressing a mattress at a series of points where tufts are to be attached, of a series of knotters arranged beneath the mattress, each comprising a vibrating twine-clamp having two independent clamping-jaws and a cutting device, a rotating knotter-head, an independent knotter-hook turning upon the knotter-head, a looper having an opening for the tufting-needle and means for vibrating said looper at intervals in a direction at right angles to the plane of vibration of the twine-clamp, to draw the twine across the knotter-head, substantially as described.

18. In a machine for tufting mattresses, the combination with a vibrating twine-clamp, of two independent clamping-jaws, one on each side thereof, a tufting-needle, means for moving the mattress sidewise between successive strokes of the needle, a knotting mechanism and means for successively closing the clamping-jaws to clamp the two strands of twine, one in each jaw, substantially as described.

19. In a machine for tufting mattresses, the combination with a vibrating twine-clamp, of two clamping-jaws, a knife intermediate said jaws, a tufting-needle, means for moving the mattress sidewise between two successive strokes of the needle, means for closing the clamping-jaws successively one after each needle-stroke and mechanism for knotting the twine and operating the knife to sever it, substantially as described.

20. In a tufting-machine, the combination with a vibrating twine-clamp beneath the mattress of two clamping-jaws one pivoted on each side thereof, a knife pivoted beneath the twine-clamp and between the jaws, a tufting-needle, means for moving the mattress sidewise between two strokes of said needle, a rotating knotter arranged on one side of the twine-clamp, a looper vibrating over the knotter, and means for clamping said jaws one after each needle-stroke and for operating said knife to sever the ends of the twine, substantially as described.

21. In a machine for tufting mattresses, the combination with a knotter-head having a lug, of a knotter-hook having independent rotation upon a concentric spindle in the knotter-head to engage with and disengage from said lug, a spring connecting said spindle to the knotter-head, and a cast-off finger traversing a channel between the knotter-head and knotter-hook in a direction contrary to their operative rotation, substantially as described.

22. In a tufting-machine the combination with a double series of feed-wheels of compressing mechanism, and means for normally adjusting the upper series toward and from the lower series independently of the mechanical compressing mechanism, substantially as described.

In testimony whereof I have hereunto set my hand in presence of two subscribing witnesses.

EDWIN NAPIER STEPHENSON.

Witnesses:
J. E. ANDERSON,
JAMES H. BELL.